(12) United States Patent
Seo et al.

(10) Patent No.: US 8,472,019 B2
(45) Date of Patent: Jun. 25, 2013

(54) SPECTROSCOPIC CHARACTERISTICS ACQUISITION UNIT, IMAGE EVALUATION UNIT, AND IMAGE FORMING APPARATUS

(75) Inventors: Manabu Seo, Kanagawa (JP); Naohiro Kamijo, Kanagawa (JP); Kohei Shimbo, Kanagawa (JP); Yoichi Kubota, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 328 days.

(21) Appl. No.: 13/037,941

(22) Filed: Mar. 1, 2011

(65) Prior Publication Data

US 2011/0222056 A1    Sep. 15, 2011

(30) Foreign Application Priority Data

Mar. 11, 2010  (JP) .................................. 2010-054063
Dec. 13, 2010  (JP) .................................. 2010-277360

(51) Int. Cl.
G01J 3/28  (2006.01)

(52) U.S. Cl.
USPC ......................................................... 356/328

(58) Field of Classification Search
USPC ......................................................... 356/328
See application file for complete search history.

(56) References Cited

U.S. PATENT DOCUMENTS

| | | | |
|---|---|---|---|
| 6,133,986 A * | 10/2000 | Johnson | 355/77 |
| 7,671,992 B2 | 3/2010 | Ehbets et al. | |
| 2007/0091197 A1 | 4/2007 | Okayama et al. | |
| 2008/0088840 A1 * | 4/2008 | Bodkin et al. | 356/328 |
| 2009/0202120 A1 | 8/2009 | Otsuka | |
| 2011/0106472 A1 * | 5/2011 | Seo et al. | 702/76 |

FOREIGN PATENT DOCUMENTS

| | | |
|---|---|---|
| CN | 1737515 A | 2/2006 |
| JP | 2002-310799 A | 10/2002 |
| JP | 2003-139702 A | 5/2003 |
| JP | 3566334 B2 | 6/2004 |
| JP | 2005-315883 A | 11/2005 |
| JP | 2008-256594 A | 10/2008 |
| JP | 2010-256324 A | 11/2010 |

* cited by examiner

*Primary Examiner* — Kara E Geisel
(74) *Attorney, Agent, or Firm* — Dickstein Shapiro LLP

(57) ABSTRACT

A spectroscopic characteristics acquisition unit includes a light emitting unit to illuminate a measurement target; a lens array including lenses to receive reflected light reflected from the measurement target; a light blocking member having a pinhole array including openings; a focusing unit to focus light coming from the pinhole array; a diffraction unit to diffract the light to different directions depending on wavelength of light received by the focusing unit; and a light receiving unit to receive the reflected light diffracted by the diffraction unit. The light receiving unit includes a spectroscopic sensor array having spectroscopy sensors including pixels. Each of the lenses constituting the lens array corresponds to one of the openings of the pinhole array. The numerical aperture NA of the lens in the arrangement direction in the lens array satisfies the formula NA>sin(θmax) with respect to the maximum angle of view θmax of the focusing unit.

12 Claims, 18 Drawing Sheets

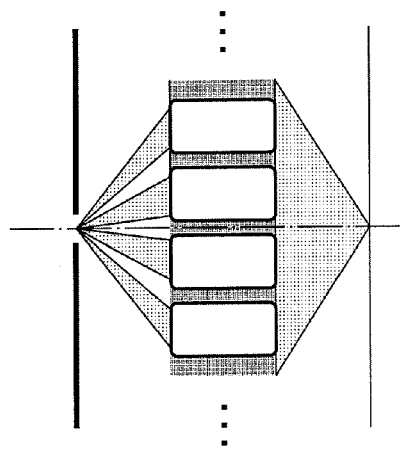
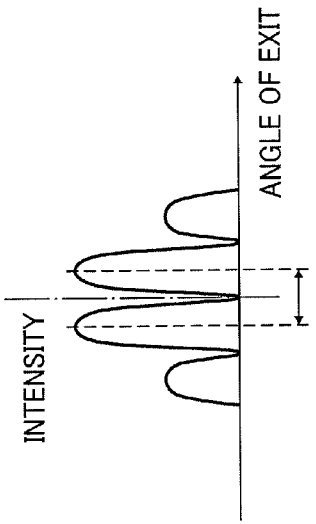
FIG. 2A
RELATED ART
FIG. 2B
RELATED ART
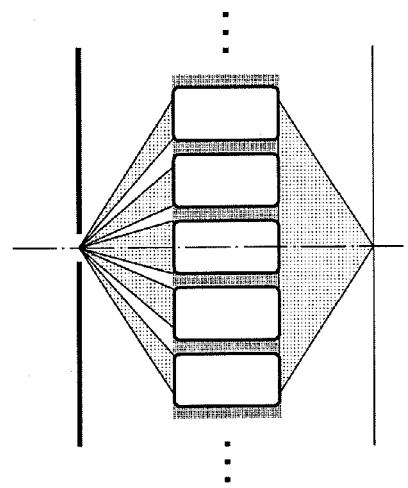
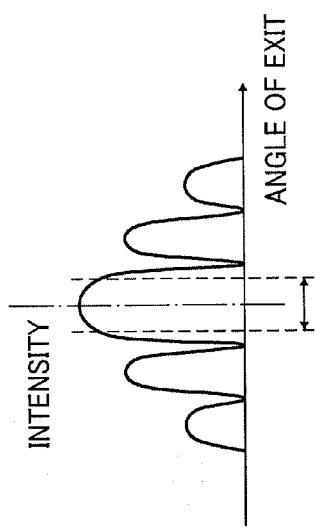

[ SIDE VIEW ]

FIG. 15
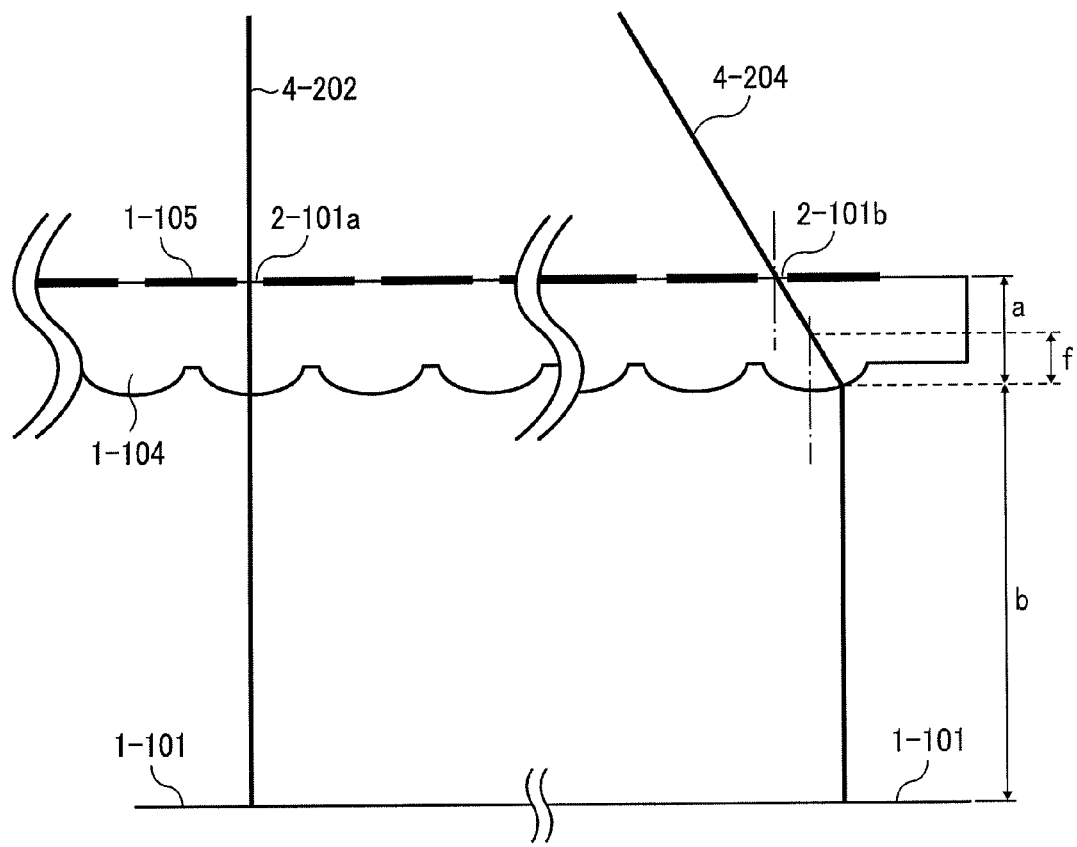
(a) CENTER OF SENSING AREA   (b) EDGE OF SENSING ARE
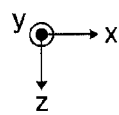

FIG. 16
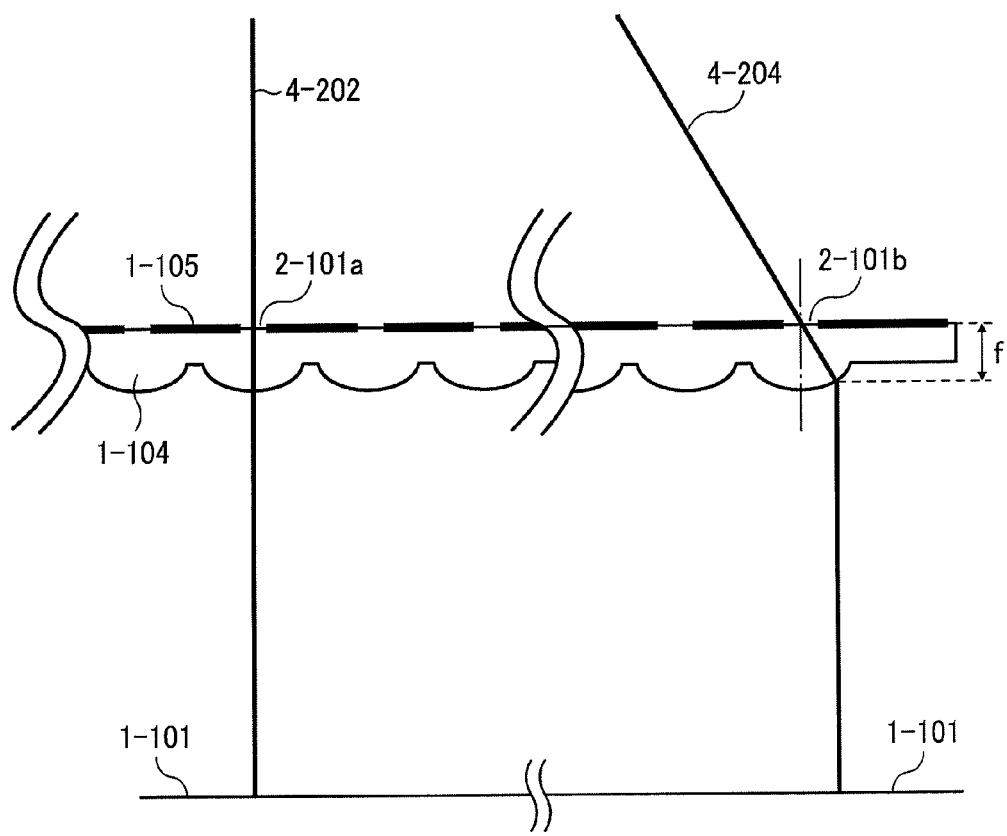
(a) CENTER OF SENSING AREA　　(b) EDGE OF SENSING ARE
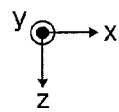

FIG. 19
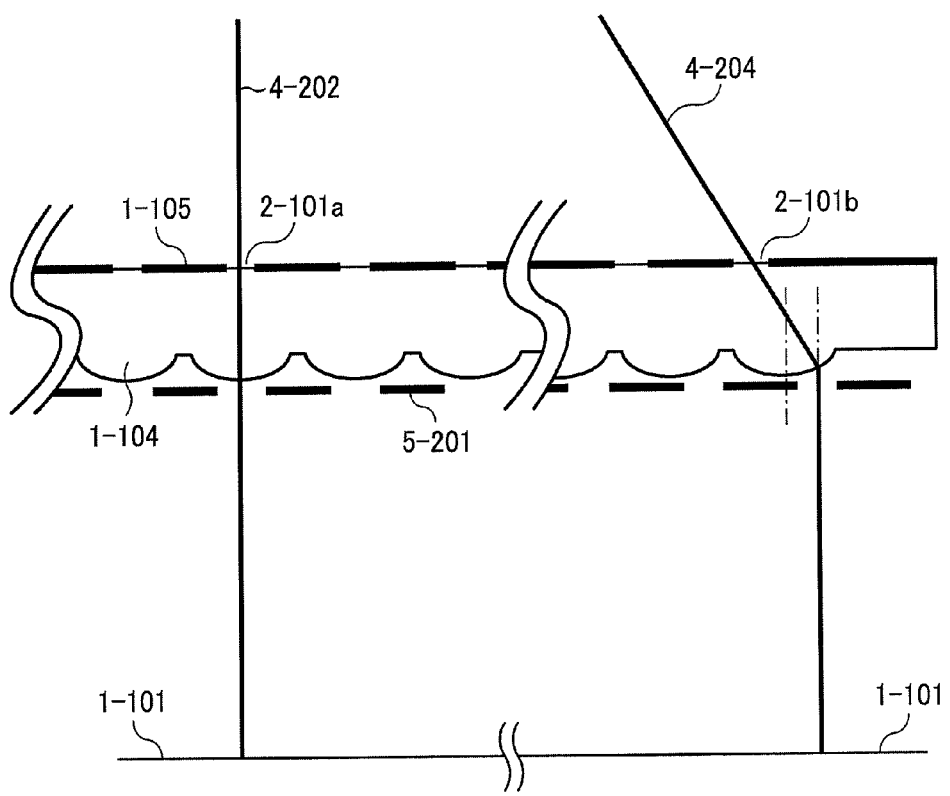
(a) CENTER OF SENSING AREA    (b) EDGE OF SENSING ARE
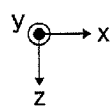

SPECTROSCOPIC CHARACTERISTICS ACQUISITION UNIT, IMAGE EVALUATION UNIT, AND IMAGE FORMING APPARATUS

CROSS-REFERENCE TO RELATED APPLICATIONS

This application claims priority to Japanese Patent Application Nos. 2010-054063, filed on Mar. 11, 2010 and 2010-277360, filed on Dec. 13, 2010 in the Japan Patent Office, each of which is incorporated by reference herein in its entirety.

BACKGROUND OF THE INVENTION

1. Field of the Invention

The present invention relates to a spectroscopic characteristics acquisition unit, an image evaluation unit having the spectroscopic characteristics acquisition unit to evaluate an output result by an image forming apparatus, and an image forming apparatus having the image evaluation unit. The spectroscopic characteristics acquisition unit has a spectroscopic sensor array to obtain spectral data of a measurement target as line data to evaluate an image formed on an image bearing medium in an image forming apparatus, and obtains spectroscopy reflectance for the entire image width to conduct measurement of colors in images.

2. Description of the Background Art

Image forming apparatuses such as printers, copiers, facsimile machines, and digital multi-functional machines, and printing machines provided with a communication function are now commercially available. Various types of image forming methods such as electrophotography, inkjet method, heat-sensitive method, or the like are employed for the image forming apparatuses. Further, in the field of production printing, digitalization has been advanced for cut-sheet production printing machines and continuous-sheet production printing machines, and various types of image forming methods such as electrophotography, inkjet method, or the like are on the market. User needs have been shifting from monochrome printing to color printing, in which demand for multi-dimensional imaging and high precision/high density have increased for printed images. Further, with the advancement of service diversification requested by various users, such as printing photo-level high-quality images, printing catalogs, printing customer-specific commercial information in bills or the like, demand for high quality imaging, security of personal information, and accurate color reproductions has also been increasing.

Some technologies for securing high-quality imaging have been applied to image forming apparatuses using electrophotography by conducting a given process for the image forming apparatuses. In one configuration, a concentration sensor is provided to the image forming apparatus to detect a toner image formed on an intermediate transfer member or a photoconductor as a toner concentration before fusing a toner image on a recording medium, and then the toner supply amount is adjusted based on the detection result. Further, in another configuration for checking personal information, instead of using an image forming process, a camera captures an output image, and then differences in information are identified by detecting text recognition and/or image-to-image differences. Further, in another configuration for color reproduction, color patches are output and color values at several points in the color patches are measured by a spectrometer, and then the color is calibrated based on the measurement result. Such technologies may be deployed to cope with fluctuation of image quality in the same page or between different pages by detecting, for example, the entire image area.

Some evaluation methods for evaluating the entire width of image have been disclosed as below. In "MEASUREMENT SYSTEM AND SCANNING DEVICE FOR THE PHOTO-ELECTRIC MEASUREMENT OF A MEASUREMENT OBJECT PIXEL BY PIXEL" of WO2006/045621 (or U.S. Pat. No. 7,671,992), a plurality of light receiving elements are arranged in a line, and a mechanism to relatively move a measurement object with respect to a detection system is disposed, and spectral characteristics for the entire width of image is measured, in which light-shielding walls is set between light receiving elements to prevent cross talk of reflection light coming from an area of the measurement object.

In "FULL-WIDTH ARRAY SPECTROPHOTOMETER, METHOD FOR FULL-WIDTH SCAN COLOR ANALYSIS OF COLOR INSPECTION OBJECT, AND METHOD FOR PERFECT TRANSVERSE-DIRECTIONAL SCAN COLOR ANALYSIS OF COLOR PRINTING SHEET" disclosed in JP-2005-315883-A, the entire width of image is continuously illuminated by a light source which can emit light having different wavelength, and then reflection light is detected to obtain spectral characteristics for the entire width of image.

In "METHOD AND DEVICE FOR DETECTING CONCENTRATION OF COLOR INK OF PRINTED MATTER" disclosed in JP-2002-310799-A, the entire face of printed image is continuously illuminated by light, then the image concentration at a given area is detected by a line sensor camera, and then the detected image concentration is averaged and compared with the reference image concentration.

In "IMAGE PROCESSOR" disclosed in JP-3566334-B, a document and the original document are scanned for a plurality of times, and then the similarities is determined using logical sum processing for images based on common color information.

In "DEVICE FOR DETECTING DENSITY OF MULTI-COLOR PRINTED IMAGE ON PRINTING SHEET" disclosed in JP-2003-139702-A, the entire area of printed image is illuminated by light, and by using a combination of a charge coupled devise (CCD) having two-dimensionally configured pixels and a diffraction grating or refractive device, spectral characteristics for the entire image can be obtained.

The color of an image may be measured for the entire image width as follows, for example. In one configuration, a plurality of light beams having different wavelength illuminates a measurement target, and an area sensor captures an image. In another configuration, a measurement system and a measurement target are relatively moved while capturing images by a line sensor. In another configuration, a plurality of capturing systems is set and used to detect reflected light reflected from a measurement target using a given limited wavelength.

When image data is obtained by using a given range of wavelength, if some positional deviation may occur for a measurement target between images, color information at each position on the measurement target cannot be measured correctly.

Color information of a plurality of images, which may correspond to different wavelength, may be correctly measured by several methods. For example, in one method, intensity of reflected light obtained at a point of measurement target of each image is compared with reference image such as original image or document data. In another method, based on intensity of reflected light obtained at a point of measurement target of each image, continuous spectral characteristics are estimated using Wiener estimation or the like.

In such methods, however, when different positions are measured as the measurement target in each of printed images, an error may occur in data comparison between the measured data and reference data and the estimation of continuous spectral characteristics, causing measurement precision to deteriorate.

The above-mentioned related arts may have some problems as follows. In WO2006/045621 (or U.S. Pat. No. 7,671,992), the measurement system includes a line sensor, by which color of measurement target image can be measured for the entire width of image, but it may not have a configuration to reduce positional deviation of image obtained at each wavelength.

In JP-2005-315883-A, the reflection light from a measurement target is continuously obtained by illuminating light on the measurement target using a light source which can emit light having different wavelength. However, deviation may occur in the timeline, by which a same portion of measurement target cannot be measured. Even if a plurality of combinations of the light source and light receiving unit is employed for this configuration, positional deviation of measurement target for each image corresponding to different wavelength may occur. Further, even if a plurality of detectors for filtering light using different colors is included in this configuration, positional deviation between images for a plurality of colors may occur.

In JP-2002-310799-A, color information is obtained for the entire width of image, and then the concentration of detected area is averaged to obtain a representative value, but the color profile for the measurement target may not be guaranteed.

In JP-3566334-B, the image of original document and the image of measurement target are compared for each wavelength to determine the difference of original and measurement target, but fluctuation of color quality of between the measurement target such as printed images cannot be determined. Further, even if an image is reproduced from color information of each one of images, obtained one by one, it cannot be determined whether fluctuation of color quality actually occurs to the measurement targets.

In JP-2003-139702-A, the CCD having two-dimensionally configured pixels is used to obtain image data in one direction and spectral data in the other direction so as to measure color information for the entire width of image.

However, because the reading speed of CCD having two-dimensionally configured pixels is too slow compared to a line sensor due to a limitation of data reading performance of CCD, there is a limit for speed to obtain color information of measurement target. As such, as for conventional spectroscopy sensor measuring spectroscopy information of a measurement target for the entire width of image, it is hard to conduct a high-speed reading with a high spectroscopy precision at the same time.

In view of the above-described problems of the conventional art, the inventors of the present invention have proposed a spectroscopic characteristics acquisition unit as disclosed in JP-2010-256324-A, which includes a light emitting unit to emit light onto a measurement target, a spectroscopy sensor to diffract diffuse-reflected light reflected from the measurement target illuminated by the light emitting unit, and a light receiving unit to receive the diffuse-reflected light diffracted by the spectroscopy sensor. The light receiving unit may include a spectroscopic sensor array having a plurality of spectroscopy sensors arranged in one direction. The spectroscopy sensor may include a given number of pixels arranged in one direction, which can be sensitive to different light having different spectral characteristics.

FIG. 1 shows an example configuration of the spectroscopic characteristics acquisition unit of JP-2010-256324-A. The spectroscopic characteristics acquisition unit may include a light source of line type, a line sensor 0-101, a diffraction grating 0-102, an image-focusing optical system 0-103 used as a first focusing unit, a pinhole array 0-104 having a plurality of pinholes, and a Selfoc (registered trademark) lens array 0-105 used as a second focusing unit. Light emitted from the line light source is reflected by an image bearing medium 0-106 (e.g., paper), and the diffuse-reflected light is guided to the pinhole array 0-104 by the Selfoc lens array 0-105. The light exiting from a plurality of pinholes of the pinhole array 0-104 reaches the image-focusing optical system 0-103, is diffracted by the diffraction grating 0-102, and then focused on the line sensor 0-101. The line sensor 0-101 includes a plurality of spectrometer units arranged in one direction, in which one image exiting from one pinhole enters one spectrometer unit.

The selfoc lens array 0-105, used as the second focusing unit (or image-focusing optical unit) and a contact-type focusing device has the following merits: (1) even if a distance period of pinholes of the pinhole array 0-104 and a distance period of elements of the contact-type focusing device are different, the measurement target image can be focused on the pinhole array 0-104; and (2) relative positioning of the contact-type focusing device and the pinhole need not be strictly accurate.

However, in the optical system of FIG. 1, a problem such as the variation or fluctuation of light intensity may occur between individual spectrometers. The difference between the lens distance period of the selfoc lens array 0-105 and the pinhole distance period of the pinhole array 0-104 may cause light exiting angle to fluctuate, and thus the light intensity that can be coupled to the image-focusing optical system fluctuates depending on locations on the selfoc lens array 0-105 and the pinhole array 0-104. Such condition is explained with reference to FIGS. 2A and 2B.

FIG. 2A shows a case when the lens center of one lens of the selfoc lens array and the center of one pinhole are aligned, in which a light path is shown in the upper side of FIG. 2A and the light intensity profile of light emitting from the pinhole at various angles is shown in the lower side of FIG. 2A. In FIGS. 2A and 2B, the shaded portion indicates the light path. Because one pinhole receives light from a plurality of selfoc lenses, the exiting light intensity profile includes a plurality of peaks for different light emitting angles. Because the image-focusing optical system used as the first focusing unit has a finite entrance pupil, an image around the center (exiting angle: 0 degree) can be taken in FIG. 2A.

FIG. 2B shows a condition when the lens center of the selfoc lens array and the center of one pinhole are not aligned with each other. Generally, as for the light intensity profile of light emitting from the pinhole at various angles, light intensity becomes weaker at the center of the exiting light profile and stronger around the center of the exiting light profile as shown in FIG. 2B. As a result, the light intensity that can be taken by the image-focusing optical system, configured as shown in FIG. 2B, becomes small compared to a configuration when the lens center and the pinhole center are aligned as shown in FIG. 2A. As such, when the pinhole distance period of pinhole array and the lens distance period of selfoc lens array are different, fluctuation may occur to intensity of the light that is taken in.

Further, another issue is discussed. In the line-type spectroscopy sensor of FIG. 1, the farther from the center portion of sensing area and the closer to the edge portion of sensing area (i.e., as image height with respect to a focus lens becomes greater), the angle of exiting light, exiting from the pinholes and taken by the image-focusing optical system, becomes more slanted for the light exiting from the portion closer to the edge portion of sensing area as shown in FIG. 1.

For example, as shown in FIG. 3, the light intensity that can be taken by the image-focusing optical system for the light exiting from the edge portion of sensing area becomes small compared to the light intensity of the light exiting from the center portion of sensing area because the angle of exiting light at the edge portion of sensing area becomes greater than the angle of exiting light at the center portion of sensing area. Further, fluctuation of taken-light intensity may occur at other portion between the center portion and the edge portion of sensing area depending on the angle of exiting light. Such issue may still remain even if the lens pitch of selfoc lens array and the pinhole pitch are matched.

As a result, as shown in FIG. 4, the light intensity that can be taken for image height having different height may periodically vary or fluctuate as shown by a solid line, and the light intensity may become smaller for the image having higher image height. FIG. 4 also shows an ideal light intensity profile using a dotted line. The term "image height" means an image height with respect to the image-focusing optical system, and the maximum image height means the greatest image height for the effective sensing area. JP-2010-256324-A is silent about such light intensity reduction phenomenon of light exiting from the edge portion of sensing area.

Further, still another issue is discussed. In FIG. 1, the diffuse-reflected light reflected from the center portion of sensing area in the image bearing medium 0-106 such as paper reflects from the sensing area substantially perpendicular from the image bearing medium 0-106 and eventually reaches the image-focusing optical system, while the diffuse-reflected light reflected from the edge portion of sensing area in the image bearing medium 0-106 is reflected from the sensing area at an angle and eventually reaches the image-focusing optical system at that angle. In general, the reflected light reflected from printed images has angle-specific spectral characteristics, in which the spectral characteristics of light reflected with different angles have different spectral characteristics even if lights are reflected from the same image when the same image is disposed at different positions on the image bearing medium 0-106. Therefore, in the configuration shown in FIG. 1, the spectral characteristics obtained from the center portion of the sensing area and the spectral characteristics obtained from the edge portion of sensing area may become different, and a measurement error may occur due to such angle-specific spectral characteristics.

SUMMARY

In one aspect of the present invention, a spectroscopic characteristics acquisition unit is devised. The spectroscopic characteristics acquisition unit includes a light emitting unit to emit light to illuminate a measurement target; a lens array including a plurality of lenses arranged in one direction to receive a portion of reflected light reflected from the measurement target; a light blocking member having a pinhole array therein comprising a plurality of openings arranged in one direction, light coming from the lens array passing through the plurality of openings; a focusing unit to focus light coming from the pinhole array as an image at a given position; a diffraction unit to diffract the light to different directions depending on wavelength of light received by the focusing unit; and a light receiving unit to receive the reflected light diffracted by the diffraction unit, the light receiving unit being positioned at a position where the focusing unit focuses an image. The light receiving unit includes a spectroscopic sensor array having a plurality of spectroscopy sensors arranged in one direction, each of the spectroscopy sensors including a given number of pixels arranged in one direction, each pixel being sensitive to different light having different spectral characteristics. Each of the lenses constituting the lens array corresponding to one of the openings of the pinhole array. The numerical aperture NA of the lens in the arrangement direction of the lenses in the lens array satisfying the formula $NA > \sin(\theta max)$ with respect to the maximum angle of view $\theta max$ of the focusing unit.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIGS. 2A and 2B show lens characteristics of the spectroscopic characteristics acquisition unit of FIG. 1;

FIGS. 11A and 11B schematically show a light expansion area exiting from a pinhole of a pinhole array, in which FIG. 11A shows a case when lens having a smaller NA is used, and FIG. 11B shows a case when a lens having a greater NA is used;

FIG. 15 shows a schematic cross-sectional view of a finite optical system, in which a plurality of openings of pinhole array is deviated or offset from the center optical axis of a corresponding lens;

FIG. 16 shows a schematic cross-sectional view of an optical system of the infinite system, in which a plurality of openings of pinhole array is offset from the center optical axis of a corresponding lens;

FIG. 19 shows an enhanced mask shape for mask of FIG. 18;

Figure 1:
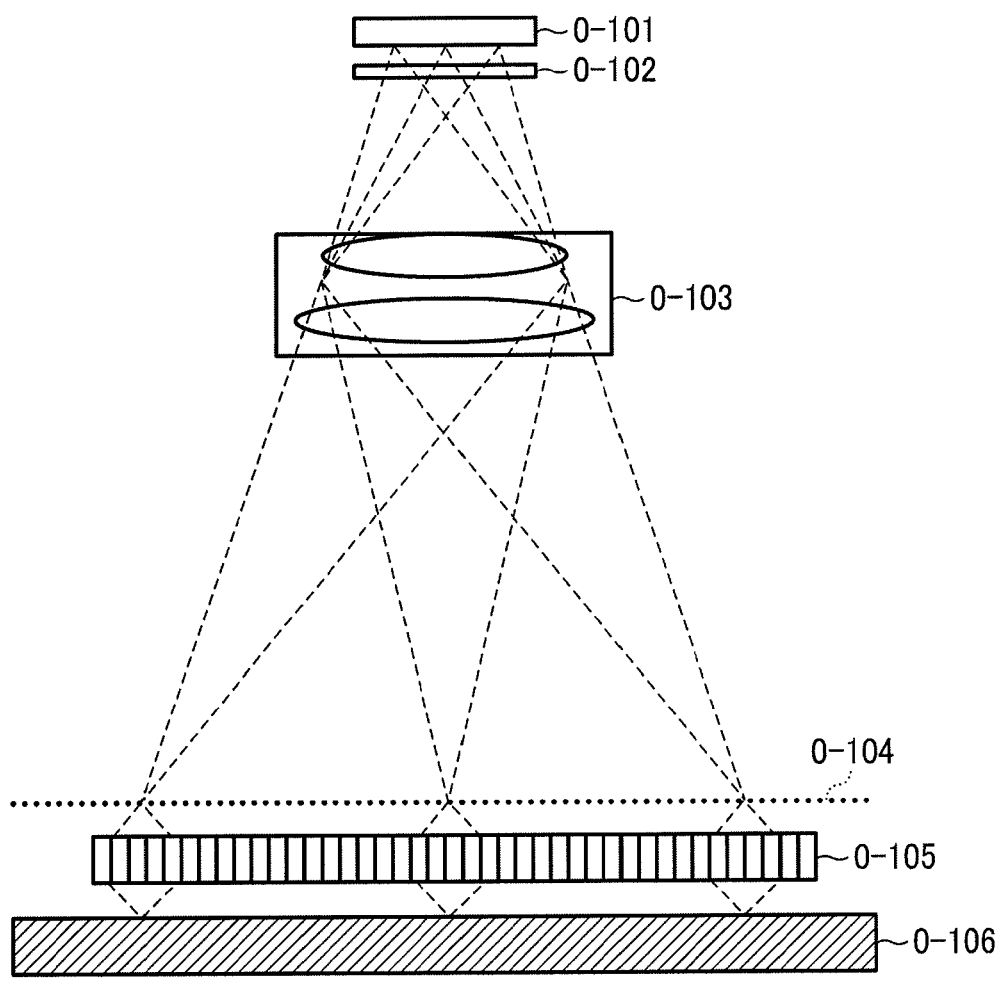
FIG. 1 shows a front view of a schematic configuration of a related-art spectroscopic characteristics acquisition unit.
Figure 3:
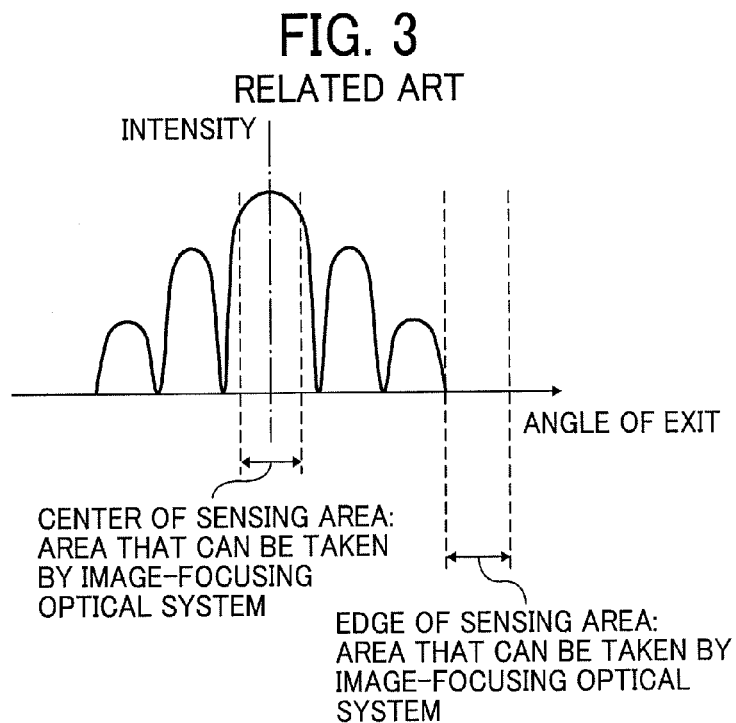
FIG. 3 shows an example intensity profile of light detected by the spectroscopic characteristics acquisition unit of FIG. 1.
Figure 4:
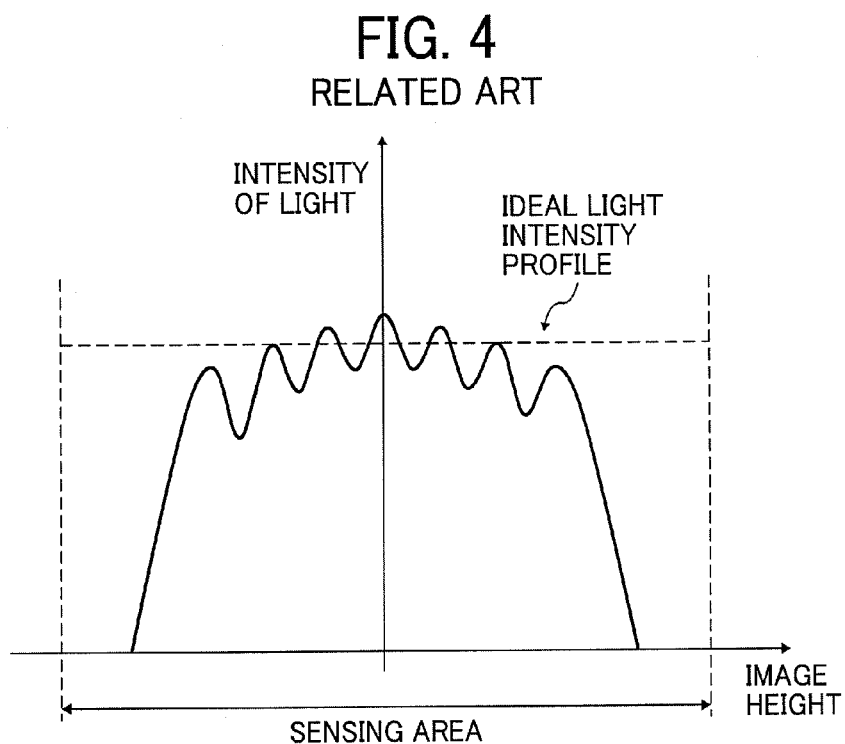
FIG. 4 shows an example intensity profile of sensing area detected by the spectroscopic characteristics acquisition unit of FIG. 1.

The accompanying drawings are intended to depict exemplary embodiments of the present invention and should not be interpreted to limit the scope thereof. The accompanying drawings are not to be considered as drawn to scale unless explicitly noted, and identical or similar reference numerals designate identical or similar components throughout the several views.

DETAILED DESCRIPTION OF EXEMPLARY EMBODIMENTS

A description is now given of exemplary embodiments of the present invention. It should be noted that although such terms as first, second, etc. may be used herein to describe various elements, components, regions, layers and/or sections, it should be understood that such elements, components, regions, layers and/or sections are not limited thereby because such terms are relative, that is, used only to distinguish one element, component, region, layer or section from another region, layer or section. Thus, for example, a first element, component, region, layer or section discussed below could be termed a second element, component, region, layer or section without departing from the teachings of the present invention.

In addition, it should be noted that the terminology used herein is for the purpose of describing particular embodiments only and is not intended to be limiting of the present invention. Thus, for example, as used herein, the singular forms "a", "an" and "the" are intended to include the plural forms as well, unless the context clearly indicates otherwise. Moreover, the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Furthermore, although in describing views shown in the drawings, specific terminology is employed for the sake of clarity, the present disclosure is not limited to the specific terminology so selected and it is to be understood that each specific element includes all technical equivalents that operate in a similar manner. Referring now to the drawings, a spectroscopic characteristics acquisition unit according to example embodiment is described hereinafter.

Figure 5:
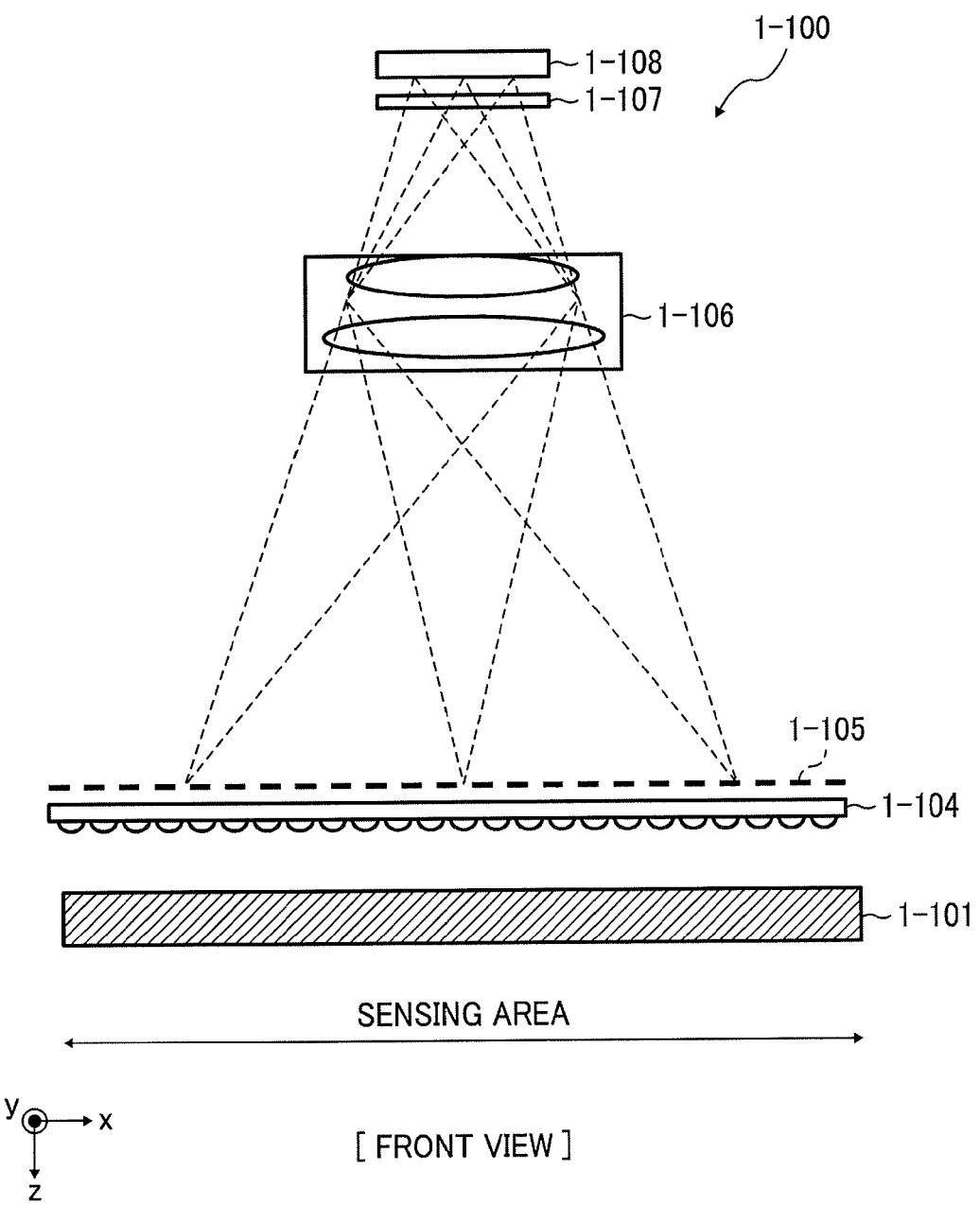
FIG. 5 shows a front view of schematic configuration of spectroscopic characteristics acquisition unit according to an example embodiment.
Figure 6:
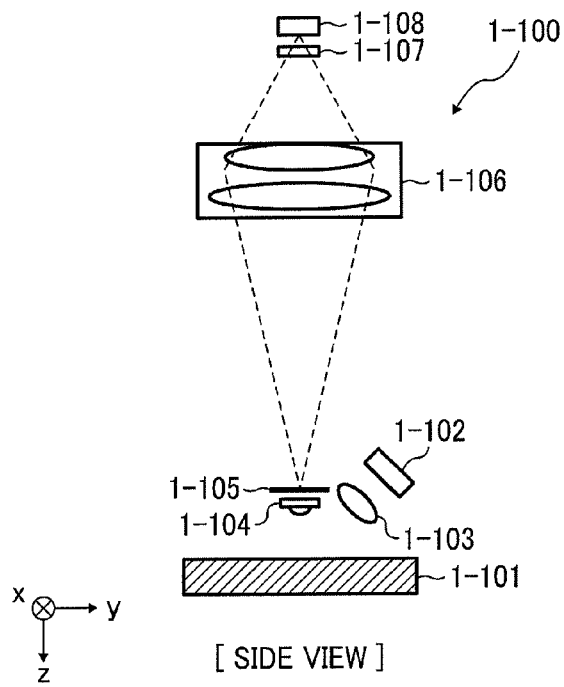
FIG. 6 shows a side view of the spectroscopic characteristics acquisition unit of FIG. 5.

FIGS. 5 and 6 show one example of a spectroscopic characteristics acquisition unit according to an example embodiment. FIG. 5 shows a front view of a schematic configuration of spectroscopic characteristics acquisition unit 1-100, and FIG. 6 shows a side view of the spectroscopic characteristics acquisition unit 1-100 shown in FIG. 5. Hereinafter, the x direction, y direction, and z direction may be used as axis directions indicated in drawings. As shown in FIGS. 5 and 6, a light emitting unit may include a line-type light source 1-102 such as light emitting diode (LED) array, and a collimate lens 1-103. The light emitting unit can emit light to illuminate an image bearing on an image bearing medium 1-101 such as paper, sheet, or the like, in which light illuminates the entire sensing area of image by setting a given area as line illumination area.

The line-type light source 1-102 may be, for example, a white LED array, which can emit visible light with a given light intensity for almost entire wavelength range of visible light. Further, the line-type light source 1-102 may be a fluorescent lamp such as a cold-cathode tube, a lamp light, or the like. The line-type light source 1-102 preferably emits light that has a given wavelength range required for spectroscopy and can uniformly illuminate the entire sensing area of image.

The collimate lens 1-103 collimates light emitted from the line-type light source 1-102 as substantially parallel light to illuminate the image bearing medium 1-101, or focuses light to illuminate the image bearing medium 1-101. As such, the line-type light source 1-102 and the collimate lens 1-103 may configure a light emitting unit, but the collimate lens 1-103 can be omitted.

An image existing on the image bearing medium 1-101 may be focused on the pinhole array 1-105 using a micro lens array 1-104. Such image may not be focused on the pinhole array 1-105 in a strict manner, but an image may be focused with some allowable deviation, or the infinite system may be used for focusing an image on the pinhole array 1-105. The detail of the micro lens array 1-104 such as shape and light path will be described later.

Light passing the pinhole array 1-105 is diffracted by an image-focusing optical system 1-106 used as a focusing unit and a diffraction element 1-107, and then focused on pixels of a line sensor 1-108 as an image focused on the pinhole array 1-105. The dotted lines in FIGS. 5 and 6 indicate the light path of light diffused and reflected from the image bearing medium 1-101 after passing the pinhole array 1-105. The focusing unit means an image-focusing optical system having one optical axis, and may not be an optical array system such as a lens array, a selfoc lens array, or the like.

Further, a configuration using an array optical system between the pinhole array 1-105 and a sensor can be devised. For example, JP-2008-256594-A discloses such configuration, in which a spectrometer unit includes a first lens array, an aperture opening provided for each lens, a second lens array provided for each aperture opening, a diffractive optical element, and a light receiving element.

To measure condition of color images in an output image, which may be output by printers or copiers, the entire image width area may be used as a sensing area. When an array optical system is used to detect such sensing area, the array optical system may need a sensor having the same width of the sensing area. Such sensor may be difficult to manufacture, further, even if such sensor is manufactured, such sensor is manufactured by connecting a plurality of sub-sensors, and thereby pixels may not exist at the connection portion between the sub-sensors. Instead of using the array optical system for the image-focusing optical system, a compact optical system may be used for the image-focusing optical system, in which a wider area can be sensed using a small sensor.

The line sensor 1-108 may be configured with a plurality of pixels and can be used as a light receiving unit to receive and detect light intensity of diffuse-reflected light having a given wavelength range, which enters the line sensor 1-108 via the diffraction element 1-107. The line sensor 1-108 may be a line sensor configured with, for example, a metal oxide semiconductor device (MOS), a complimentary metal oxide semiconductor device (CMOS), a charge coupled device (CCD), a photo diode array (PDA), or the like. Such line sensor 1-108 may be also referred to as line detector.

Figure 7:
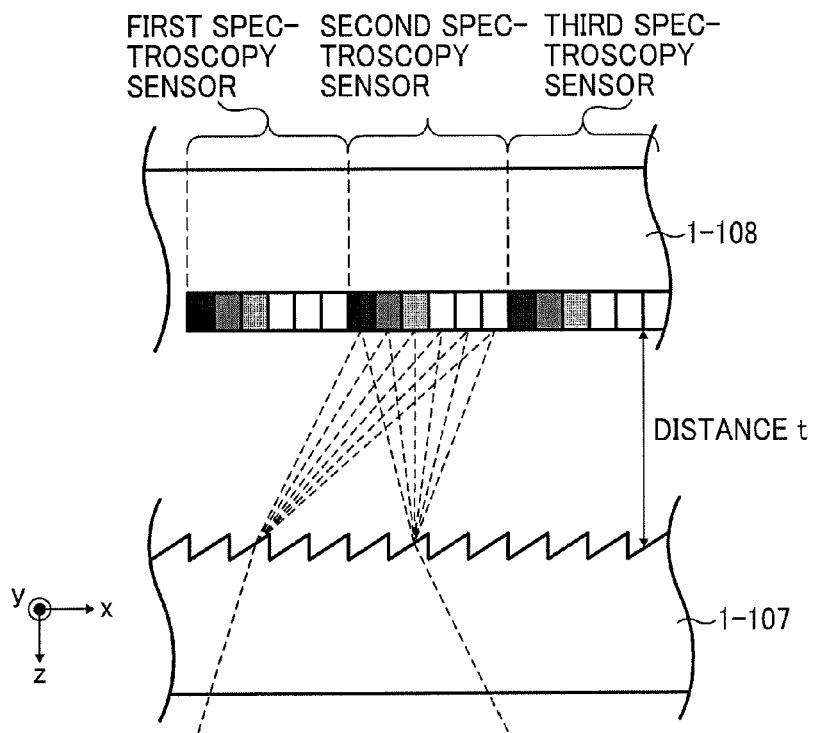
FIG. 7 shows a schematic configuration of pixel configuration of a line sensor of the spectroscopic characteristics acquisition unit of FIG. 5.

FIG. 7 shows a schematic internal configuration of the line sensor 1-108 configured with the number of pixels. As shown in FIG. 7, the line sensor 1-108 may be configured with a plurality of pixels arranged in the x direction. Specifically, the line sensor 1-108 may be configured as an array of plurality of spectroscopy sensors, in which, for example, a first spectroscopy sensor, a second spectroscopy sensor, and a third spectroscopy sensor may be included as shown in FIG. 7. The first spectroscopy sensor may be configured with N pixels arranged in the x direction, the second spectroscopy sensor may also be configured with N arranged in the x direction, and the third spectroscopy sensor may also be configured with N pixels arranged in the x direction. As such, each of the first, second, and third spectroscopy sensors may include N pixels that can receive light having different spectral characteristics. The spectroscopic characteristics acquisition unit 1-100 may be configured as such.

The diffraction element 1-107 may be disposed at a position close to the line sensor 1-108. As the light path is indicated by the dotted lines in FIG. 7, the incidence light to the diffraction element 1-107 may be diffracted in the x direction, by which light having different spectral characteristics enters pixels of the line sensor 1-108 having N pixels. The diffraction element 1-107 may be transparent base having formed a sawtooth shape periodically on the transparent base as shown in FIG. 7, which is a cross-sectional view of the diffraction element 1-107.

When the tooth period of sawtooth shape of the diffraction element 1-107 is set to "p," the light having a wavelength λ entering the diffraction element 1-107 with an angle θin is diffracted by the diffraction element 1-107 with an angle θm defined by the following formula (A).

$$\sin \theta m = m(\lambda/p) + \sin \theta in \qquad \text{formula (A)}$$

In the formula (A), "m" is diffraction order number of the diffraction element 1-107, which is a positive or negative integral number.

Because the diffraction angle θm changes depending on the value of wavelength λ, as defined by the formula (A), different light having different spectral characteristics enters a corresponding pixel of N pixels configuring one spectroscopy sensor. Further, a light block member may be preferably disposed between the diffraction element 1-107 and the line sensor 1-108 to prevent an entering of zero (0) order light that does not diffract, the second order diffraction light, the minus first (−1) order diffraction light, or the like to the line sensor 1-108 because the entering of such light to the line sensor 1-108 may degrade precision of detection. As a more preferable configuration, the diffraction direction of diffraction grating may be slanted with respect to an arrangement direction of pixels of the line sensor 1-108 with a given angle. Such configuration will be explained with reference to FIG. 8.

Figure 8:
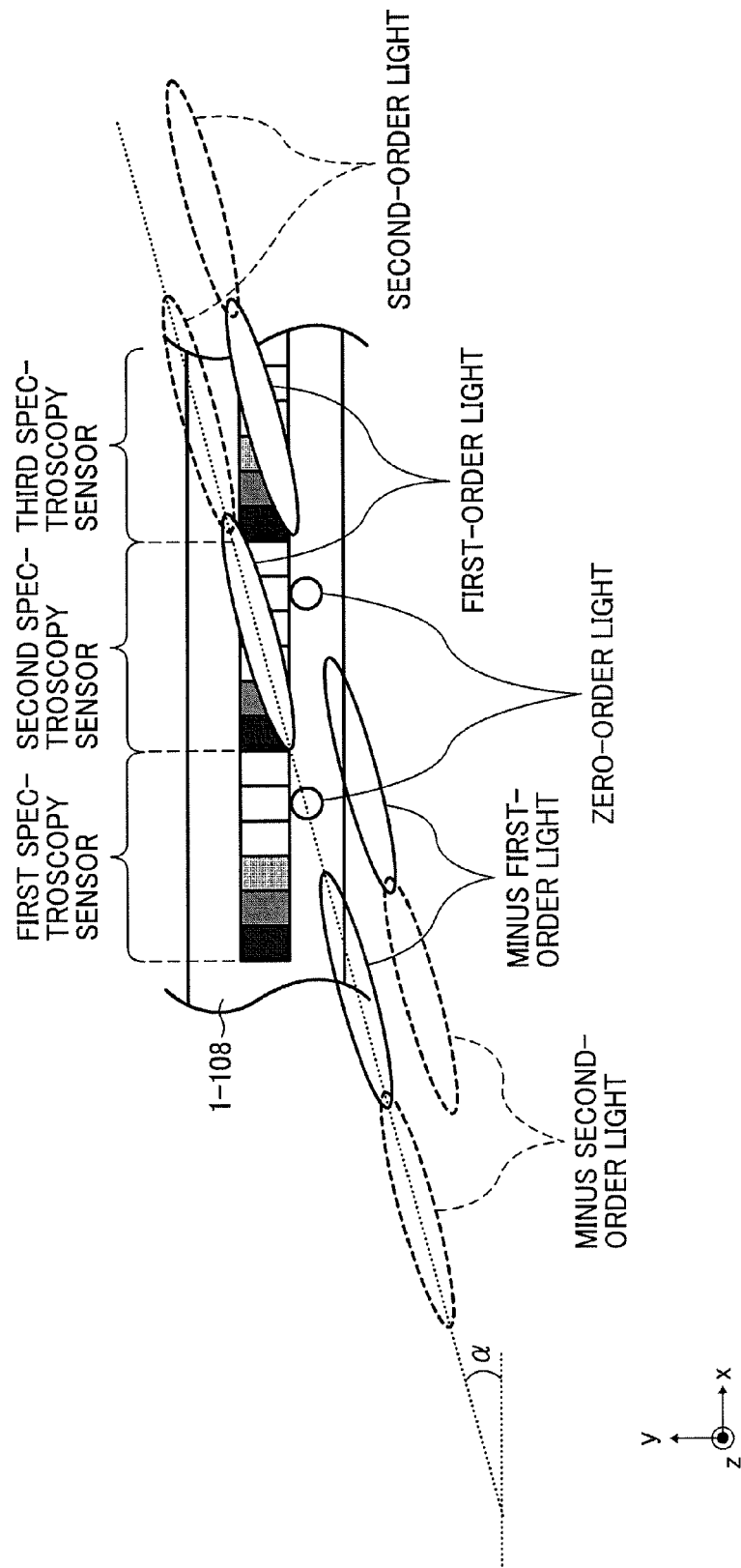
FIG. 8 shows a schematic view of a line sensor and light entering the line sensor, viewed from a light-entering face side.

FIG. 8 shows a schematic condition of light, which enters the line sensor 1-108, which is viewed from a light-entering face side of the line sensor 1-108. In FIG. 8, the first (1) order light, which is a desired diffraction light that passes the diffraction element 1-107 (see FIG. 7) is shown. Further, other than the first (1) order light, the zero (0) order light, the minus first (−1) order light, the plus and minus second (±2) order light, or the like which has a lower light intensity compared to the first (1) order light, are also diffracted by the diffraction element 1-107 and passes the diffraction element 1-107.

As shown in FIG. 8, the diffraction direction of diffraction grating may be slanted with respect to the x direction with an angle α. Specifically, the diffraction grating may be disposed at a position as follows. The diffraction vector direction of the diffraction element 1-107 (see FIG. 7) is slanted with respect to the x direction with an angle α in the x-y plane. With such a configuration, the first (1) order light can enter the pixels of line sensor 1-108, but the 0 order light, −1 order light, ±2 order light or the like may not substantially enter the pixels of line sensor 1-108. Further, the light block member may be provided before the line sensor 1-108 to shield light, which is not necessary for the line sensor 1-108.

In an example optical system shown in FIG. 6, light emitted from the line-type light source 1-102 enters the image bearing medium 1-101 with an angle of about 45 degrees, and the line sensor 1-108 receives diffuse-reflected light (diffused reflection) reflected from the image bearing medium 1-101 in a perpendicular direction, and thereby such optical system is referred to as the 45/0 optical system. However, the configuration of optical system is not limited to the configuration of FIG. 6. For example, light emitted from the line-type light source 1-102 enters the image bearing medium 1-101 from a perpendicular direction, and the line sensor 1-108 receives diffuse-reflected light reflected from the image bearing medium 1-101 in an angle of about 45 degrees, and such optical system is referred to as 0/45 optical system.

The pinhole array 1-105 may be made of a light shielding material or light blocking member formed into, for example, a plate, and a plurality of openings such as rectangular slit is formed in the plate and arranged in one row, in which light passes through the openings. Light beam, which passed through one slit of the pinhole array 1-105, follows the light path shown in FIG. 7 (see dotted line), and enters of the line sensor 1-108 having N pixels. One slit corresponds to one spectroscopy sensor, and the pinhole face and the light receiving face of the line sensor 1-108 are set in an image-focusing relationship each other. Further, by parallelly arranging the slits and the N pixels in one direction, the spectroscopic sensor array can be arranged in parallel to the slits and pixels in one direction. With the above-described configuration, the spectroscopic characteristics acquisition unit 1-100 can obtain spectral characteristics of line area with a wider area.

Figure 9:
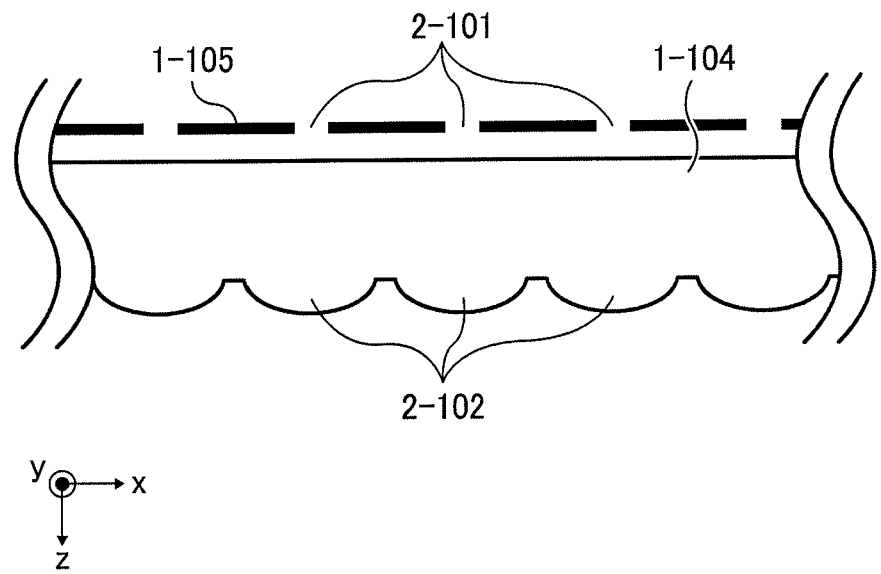
FIG. 9 shows a schematic cross-sectional view of one example configuration of a micro lens array and a pinhole array.

A description is now given of an example configuration of the micro lens array 1-104 and the pinhole array 1-105. As shown in FIG. 9, the pinhole array 1-105 includes a plurality of openings 2-101 arranged in the x direction, and the micro lens array 1-104 includes a plurality of lenses 2-102 arranged in the x direction, in which each of the openings 2-101 is corresponded to one of the lenses 2-102 (one-to-one correspondence with each other), which means one opening is set for one lens.

The openings 2-101 of pinhole array 1-105 may be formed into a given shape such as a circle shape, an elliptical shape, a rectangular shape, and a square shape, for example. Especially, when an elliptical shape or rectangular shape is employed, the openings 2-101 becomes longer in the y direction with respect to the x direction, by which an effect of assembly error of the micro lens array 1-104 and the pinhole array 1-105 in the y direction can be preferably reduced. The pinhole array 1-105 can be prepared by known methods. For example, a metal plate is processed by a blackening process and holes are formed; a glass plate is processed by a black agent such as resin having chrome and carbon, in which an area not processed by the black agent becomes an opening.

The micro lens array 1-104 includes a plurality of micro lenses, which are formed on a base member such as a plate by forming the number of tiny concave and convex portions on the base member and arranged in one direction. The micro lens array 1-104 may be made of, for example, a transparent resin plate such as acrylic resin or olefin resin formed in a given shape, a transparent glass plate formed in a given shape by etching, or a glass plate having formed of a transparent resin on the glass plate. A glass plate may be preferably employed because the glass plate has a higher heat resistance property such as low expansion by heat. Further, to secure as wide a sensing area as possible, the x direction of micro lens array may need to be manufactured with a longer length, in which a plurality of parts may be arranged in the x direction by fixing the plurality of parts with a bonding method, or the like.

Figure 10:
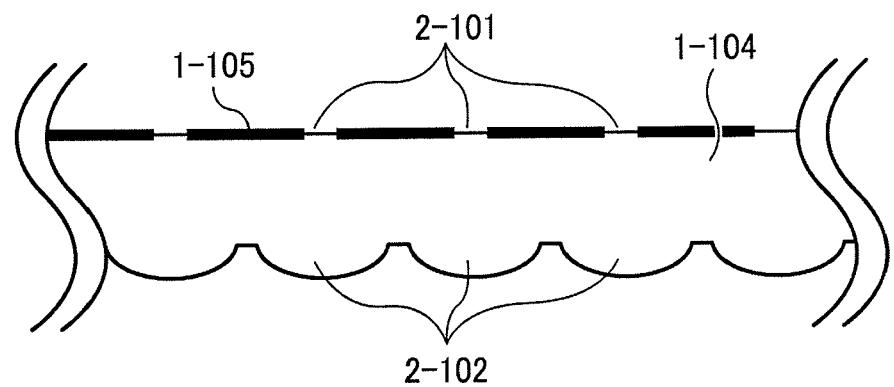
FIG. 10 shows a schematic cross-sectional view of another example configuration view of a micro lens array and a pinhole array.

Further, as shown in FIG. 10, the micro lens array 1-104 and the pinhole array 1-105 can be integrated as one unit by forming the lenses and pinholes on opposite faces of the same base member. In the present invention, the lenses of the micro lens array 1-104 and the openings of the pinhole array 1-105 are set to one-to-one correspondence with each other as described above, by which an effect of positional deviation of lenses of the micro lens array 1-104 and openings of the pinhole array 1-105 becomes greater compared to using a configuration using the selfoc lens array. If the pinhole array 1-105 and the micro lens array 1-104 are formed on the same base member as shown in FIG. 10, the number of parts can be effectively reduced, and furthermore, positional deviation of lenses of the micro lens array 1-104 and openings of the pinhole array 1-105, which may be caused by mechanical vibration and/or heat expansion, can be effectively prevented.

The numerical aperture NA of the lenses 2-102 of the micro lens array 1-104 needs to satisfy following formula (B).

$$NA > \sin(\theta max) \qquad \text{formula (B)}$$

Figure 11B:
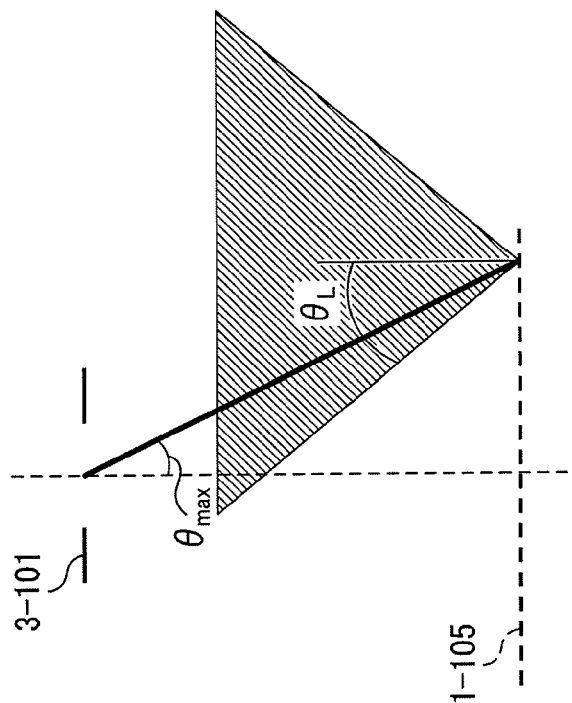
Figure 11A:
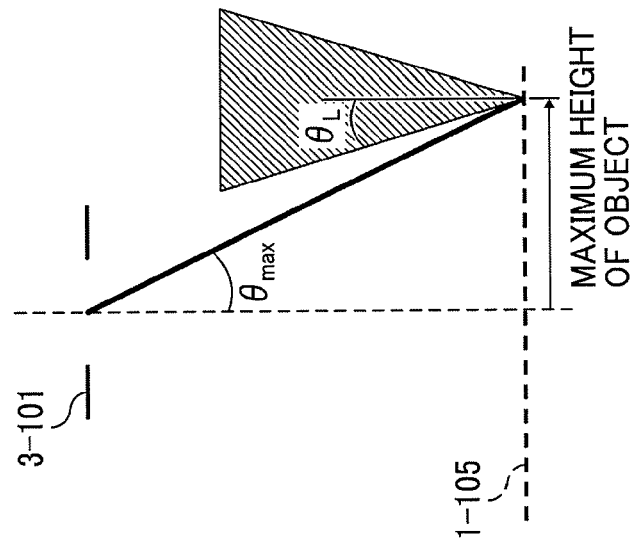

The angle $\theta max$ is a maximum angle of view of a focus lens. More specifically, as shown in FIG. 11, as for the sensing area that can be taken or captured by the line sensor 1-108, the angle $\theta max$ is the angle of most edge area (or maximum height of object) at the pinhole face of the pinhole array 1-105, which is viewed from the center of an entrance pupil 3-101 of the image-focusing optical system. The slashed area shown in FIG. 11 schematically indicates light expansion area, which exits from the pinhole of the pinhole array 1-105. FIG. 11A shows a case when a lens having a small NA is used, and FIG. 11B shows a case when a lens having a large NA is used. The light expansion angle $\theta L$ after the light exits the pinhole can be defined and approximated by the numerical aperture NA as defined by the following formula (C).

$$\sin(\theta L) = NA \qquad \text{formula (C)}$$

Accordingly, to secure a sufficient level of light intensity for light taken by a focus lens for a edge portion of sensing area, the angle $\theta L$ needs to be set greater than the angle $\theta max$ while the above formula (B) needs to be satisfied.

The numerical aperture NA of lens means a maximum numerical aperture that can be secured when a mask is not set. As described later, even if a mask having the passing areas is set, the numerical aperture NA of the lens still means a maximum numerical aperture that can be secured when a mask is not set. Further, when the curvature of lens is different between the x and y directions, the numerical aperture may become different depending on the direction. The numerical aperture NA in the above formula (B) may mean the numerical aperture in the x direction, which is an arrangement direction of lens and pinhole.

In the spectroscopic characteristics acquisition unit 1-100, the openings 2-101 of the pinhole array 1-105 and the lenses 2-102 of the micro lens array 1-104 are set in a one-to-one correspondence with each other, by which periodic fluctuation of taken-light intensity, which may be caused by unmatched condition of pitch of the openings 2-101 and pitch of lens, does not occur.

Further, the present invention may not use a lens having a higher numerical aperture such as the selfoc lens array shown in FIG. 2, which can concentrate light from a plurality of lenses onto one pinhole.

Figure 12:
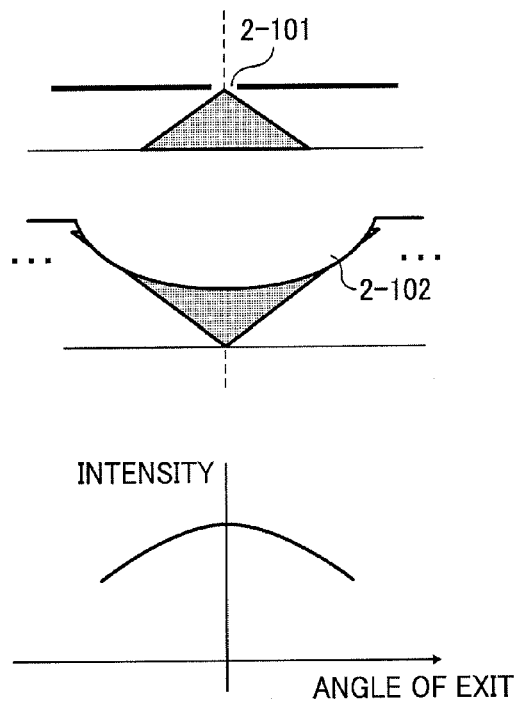
FIG. 12 shows a condition that one pinhole receives light from only one lens, and shows intensity profile of light exiting with various angles.
Figure 13:
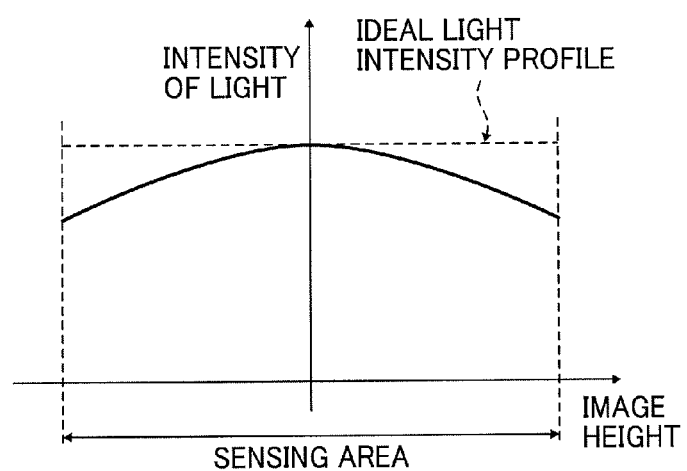
FIG. 13 shows an example intensity profile of light taken from a sensing area.

In the present invention, because one pinhole 2-101 receives light only from one lens 2-102 as shown in the upper part of FIG. 12, the light exiting from the pinhole has a light intensity profile having a mild curve for various angles of exiting light as shown in the lower part of FIG. 12. Accordingly, the above-described fluctuation of taken-light intensity at the edge portion of the sensing area is not large, and therefore the intensity profile of taken-light, which is received finally by the line sensor, assumes a profile like that shown in FIG. 13, in which the fluctuation of light intensity for the entire sensing area is not large.

In the above described spectroscopic characteristics acquisition unit, each of lenses of the lens array corresponds to one of the openings of the pinhole array as one-to-one correspondence each other, and each lens of the lens array has the NA that satisfies formula (B). With such a configuration, the light intensity profile of light, exiting from each opening of the pinhole array with various exiting angles, can be set as a milder curve, by which the light intensity profile taken by the image-focusing optical system for the entire sensing area can be set to more uniform level. With such a configuration, the spectroscopic characteristics acquisition unit having less fluctuation for light intensity taken by the spectroscopic characteristics acquisition unit for the entire sensing area can be devised, and such spectroscopic characteristics acquisition unit can be used for the image evaluation unit and image forming apparatus.

To devise the spectroscopic characteristics acquisition unit having a higher spatial resolution, the surface of an image bearing medium, which is a sensing target object, and each of openings of the pinhole array 1-105 may be set as an image focusing relationship using each of lenses of the micro lens array 1-104. Such configuration may be referred to as the optical system of a finite system hereinafter.

Figure 14:
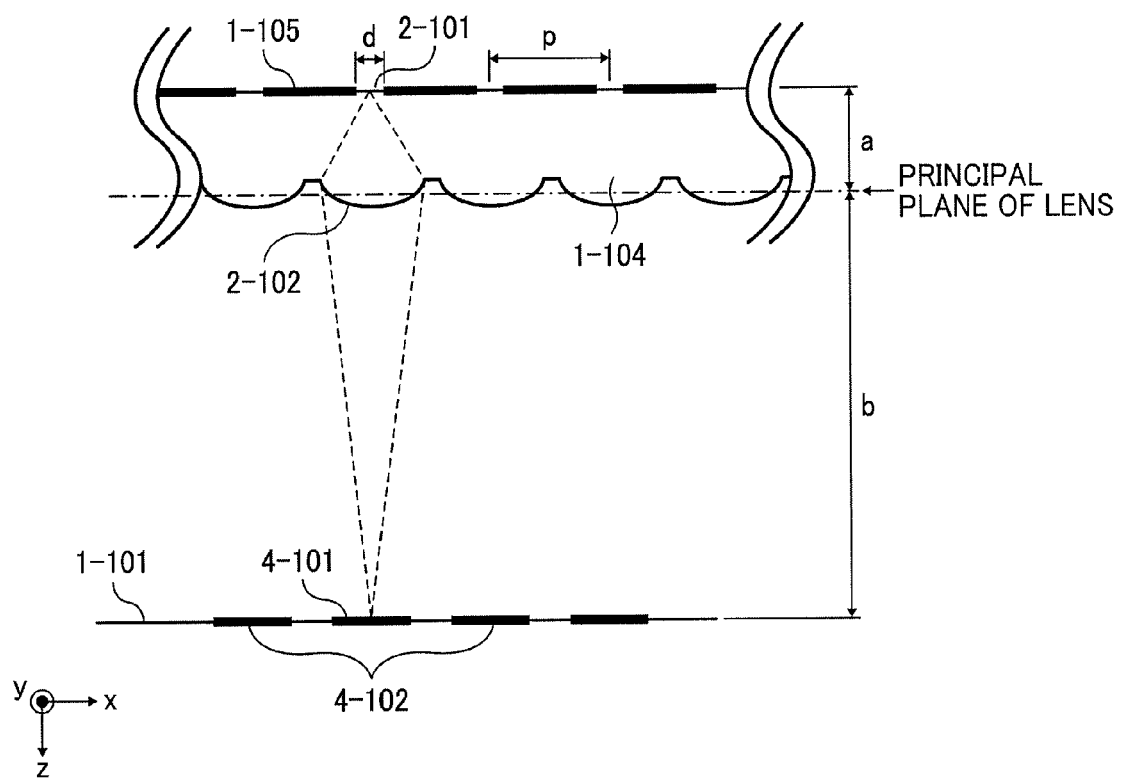
FIG. 14 shows a schematic arrangement of a pinhole array, a micro lens array, and an image bearing medium in a finite optical system.

In the finite system, as shown in FIG. 14, the distance "a" between the pinhole array 1-105 and the micro lens array 1-104 may be maintained at a given distance, and the distance "b" between the micro lens array 1-104 and the image bearing medium 1-101 may be maintained at a given distance so that an image focusing relationship can be maintained. As shown in FIG. 14, the area 4-101 on the image bearing medium 1-101 has an image focusing relationship with the opening 2-101 of the pinhole array 1-105.

To devise the spectroscopic characteristics acquisition unit having a higher spatial resolution, it is preferable that the one opening of the pinhole array 1-105 used for the area 4-101 does not overlap an adjacent opening of the pinhole array 1-105 used for the area 4-102, wherein the adjacent opening of the pinhole array 1-105 and the area 4-102 have an image focusing relationship. Accordingly, the image focusing magnification ratio M may preferably satisfy the following formula (D), in which the pitch of the pinhole array 1-105 is "p" and the opening size in the arrangement direction of the pinhole array 1-105 is "d."

$$M < d/p \qquad \text{formula (D)}$$

In the above described spectroscopic characteristics acquisition unit, the surface of image bearing medium (i.e., measurement target) and openings of the pinhole array are in an image focusing relationship by using each lens of the lens array. Further, the image focusing magnification ratio satisfies the formula (D). With such a configuration, each spectrometer can detect areas on the image bearing medium without overlapping adjacent areas when detecting each area, by which the spectroscopic characteristics acquisition unit having a higher spatial resolution can be devised.

Further, preferably, the spectroscopic characteristics acquisition unit may not be affected by angle-specific spectral characteristics. To do so, it may be necessary to take or capture light reflected from the image bearing medium in a perpendicular direction for the entire sensing area.

Such issue may be solved by employing a configuration shown in FIG. 15, in which each of a plurality of openings of the pinhole array 1-105 may be deviated from the center of optical axis of corresponding lens. Further, the deviation amount may be set differently depending on locations of openings of the pinhole array 1-105. For example, the deviation amount may be zero at the center of sensing area as shown in FIG. 15(*a*), and the deviation amount becomes greater at the edge portion of sensing area as shown in FIG. 15(*b*).

In the above described spectroscopic characteristics acquisition unit, at least one of the plurality of openings of the pinhole array may be deviated from the center of optical axis of corresponding lens. Further, the deviation amount may be set differently depending on locations of openings of the pinhole array. With such a configuration, even if the finite system is employed for the optical arrangement, light reflected from the image bearing medium substantially in the perpendicular direction for the entire sensing area can be taken, by which the spectroscopic characteristics acquisition unit not affected by the angle-specific spectral characteristics can be devised.

As shown in FIG. 15(*a*), at the center portion of sensing area, the main light ray 4-202 passing the opening 2-101*a*, which is to be taken or captured by the image-focusing optical system, is parallel to the z direction. As shown in FIG. 15(*b*), at the edge portion of sensing area, the main light ray 4-204 passing the opening 2-101*b*, which is to be taken or captured by the image-focusing optical system, is slanted with respect to the z direction. To take or capture the light reflecting from the image bearing medium 1-101 with the perpendicular direction at the edge portion of sensing area, it may be preferably that the main light ray 4-204 passes a rear focal point of lens.

In the finite system, the rear focal point distance if of lens may be set shorter than the distance "a" referred to as optical distance, which is a distance between the pinhole array 1-105 and a principal plane of the micro lens array 1-104 (f<a). When such a configuration is employed, the opening of pinhole array 1-105 may be deviated from the center optical axis of corresponding lens. Further, because an angle of the main light ray entering the image-focusing optical system after passing the opening of pinhole array 1-105 becomes greater the closer to the edge portion of sensing area, and the angle of the main light may vary depending locations of the opening of pinhole array. Preferably, the deviation amount is set greater the closer to the edge portion of sensing area.

Further, different from the finite system, in the optical system of infinite system, the openings of the pinhole array 1-105 can be disposed near the rear focal point of each of lenses of the micro lens array 1-104.

An example of the infinite system is shown in FIG. 16, in which each of the openings of the pinhole array 1-105 may be formed near each of focal points of the micro lens array 1-104. In a configuration of the infinite system, even if a distance between the image bearing medium 1-101 and the micro lens array 1-104 may fluctuate, such fluctuation may not affect measurement results so much, by which an apparatus having higher robustness for measurement can be devised. Further, different from the finite system, the spectroscopic characteristics acquisition unit can reduce the angle-specific spectral characteristics (or effect of angles for spectral characteristics) without deviating the openings of pinhole array 1-105 from the optical axes of lenses of the micro lens array 1-104, by which complexity of manufacturing process can be reduced.

In the infinite system, compared to the finite system, it may not be easy to enhance the spatial resolution, and the light intensity becomes low compared to the finite system. Accordingly, it may be necessary to select the infinite system and the finite system depending on the application. Further, in such a configuration, the distance between the pinhole array 1-105 and the micro lens array 1-104 can be variably changed, in which the distance is switchable.

In the spectroscopic characteristics acquisition unit, the each of the openings of the pinhole array may be formed near the each of focal points of corresponding lens of the micro lens array 1-104. With such a configuration, the pinhole array, lens array, and image bearing medium can be optically arranged in the infinite system, by which even if a distance between the image bearing medium and the micro lens array fluctuates, such distance fluctuation does not affect measurement results so much, by which an apparatus having higher robustness for measurement can be devised.

Figure 17:
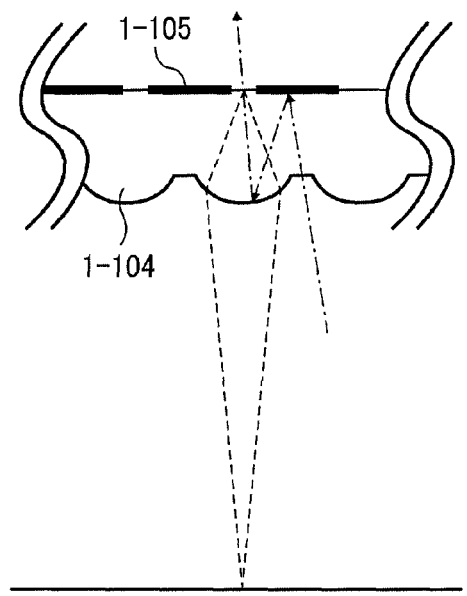
FIG. 17 shows an example path of scattering light occurring between a pinhole array and a micro lens array.

As described above, the openings of the pinhole array 1-105 and the lenses of the micro lens array 1-104 can be formed as one-to-one correspondence each other. However, light entering from a portion having no lens, or light entering from a not-corresponding lens, may enter one opening of the pinhole array 1-105 by scattering or after a plurality of times of reflection, and may exit from the one opening of pinhole array 1-105. Such existence of unintended light may cause noise, and degrade a measurement precision of the spectroscopic characteristics acquisition unit. For example, as shown by a dotted arrow in FIG. 17, light may enter from a portion other than the lens-formed portion, reflect at a portion other than the opening of the pinhole array 1-105 and a lens surface, and then enter the opening of the pinhole array 1-105. Such light can be reduced and measurement precision of the spectroscopic characteristics acquisition unit can be enhanced using a configuration shown in FIG. 18.

Figure 18:
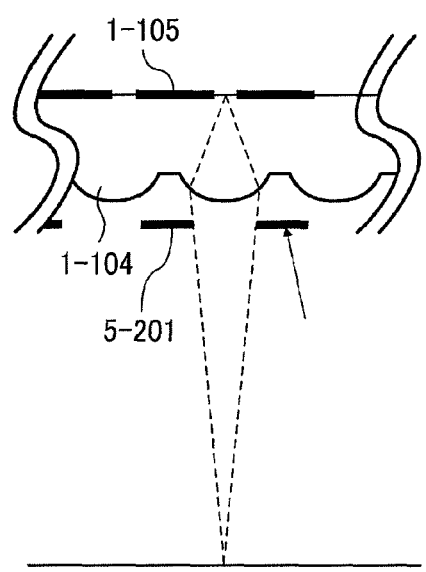
FIG. 18 shows a schematic configuration of a mask having a plurality of passing areas in view of lenses configuring a micro lens array.

As shown in FIG. 18, a mask 5-201 having a plurality of passing areas may be disposed between the micro lens array 1-104 and the image bearing medium 1-101, in which each of the plurality of passing areas of the mask 5-201 may be aligned with each of the lenses of the micro lens array 1-104. With such a configuration, the mask 5-201 can block stray light shown by an arrow in FIG. 17.

A description is given of a preferred mask with reference to FIG. 19. As described with reference to FIG. 15, at the center portion of sensing area, the main light ray 4-202 passing the opening 2-101*a* and taken by the image-focusing optical system may be parallel to the z direction, but at the edge portion of sensing area, the main light ray 4-204 passing the opening 2-101*b* and taken by the image-focusing optical system may be slanted with respect to the z direction. Preferably, the mask 5-201 blocks light other than the light to be taken by the image-focusing optical system as much as possible.

To do so, the position of passing areas of the mask 5-201 may be set as follows: At the center portion of sensing area, the deviation amount of passing area with respect to the optical axis of lens may be set to zero as shown in FIG. 19(*a*), and at the edge portion of sensing area, the deviation amount of passing area with respect to the optical axis of lens may be preferably set greater as shown in FIG. 19(*b*). As is apparent from FIG. 19(*b*), the deviation center of the passing area of the mask 5-201 is set to an opposite direction of the deviation center of the opening of the pinhole array 1-105.

Because an angle of the main light ray entering the image-focusing optical system after passing the opening of the pinhole array 1-105 becomes greater as closer to the edge portion of sensing area and varies depending on locations, the deviation amount of pinhole is preferably set greater as closer to the edge portion of sensing area. Further, although the deviation of pinhole may not be necessary for the infinite system as described above, a configuration of deviating the center of the passing area of the mask 5-201 may be also effective for the infinite system.

The mask 5-201 may be, for example, made of a metal member or black resin member used as the light block part and holes are formed therein, in which the light block part may be formed on a glass member or transparent plastic member by coating a metal film or black resin layer thereon using a patterning process.

Figure 20:
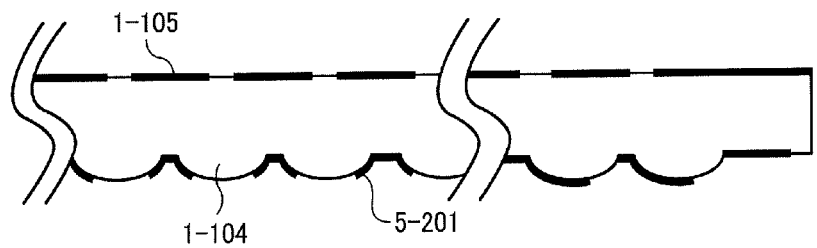
FIG. 20 shows a configuration directly forming a mask on a lens portion of micro lens array.

Further, as shown in FIG. 20, preferably, the mask 5-201 may be directly formed on given areas around the lenses of the micro lens array 1-104. In FIG. 20, the pinhole array 1-105 and the micro lens array 1-104 may be formed as one unit using one long base member such as plate. The length of arrangement direction of the pinhole array 1-105 and the micro lens array 1-104 may need to be set greater than a measurement area. For example, a spectroscopic characteristics acquisition unit to conduct a detection of short side of A3 (297 mm) may need the length of 300 mm or more. It is not easy to form a number of lenses as the micro lens array 1-104 on one long base plate, in which problems may occur such as the need for larger manufacturing machines, and the yield rate of micro lens array 1-104 may drop.

Figure 21:
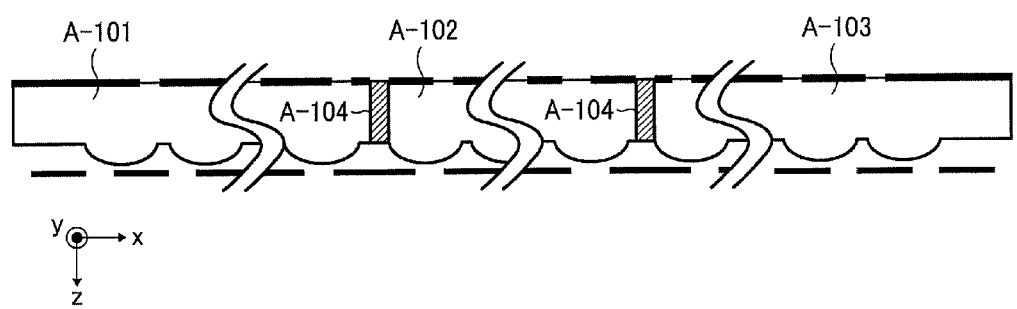
FIG. 21 shows an example of micro lens array configured by arranging a plurality of short base plates.

To reduce the cost of manufacturing, the micro lens array 1-104 may be configured by arranging a plurality of numbers of shorter base plates. FIG. 21 shows one example of such configuration, in which the micro lens array 1-104 and the pinhole array 1-105 can be formed by bonding a first chip A-101, a second chip A-102, and a third chip A-103 each other using a connection part A-104, but problems may occur at the bonded connection part A-104. For example, stray light entering from an edge face of the base plate at the connection part A-104 negatively affects measurement result, and light passing the connection part A-104 and reaching the line sensor causes problems such as flare. Using black resin for the connection part A-104 can prevent such problems. However, even if black resin is filled at the connection part A-104, some light may still pass black resin and causes flare, and measurement error may occur.

Figure 22:
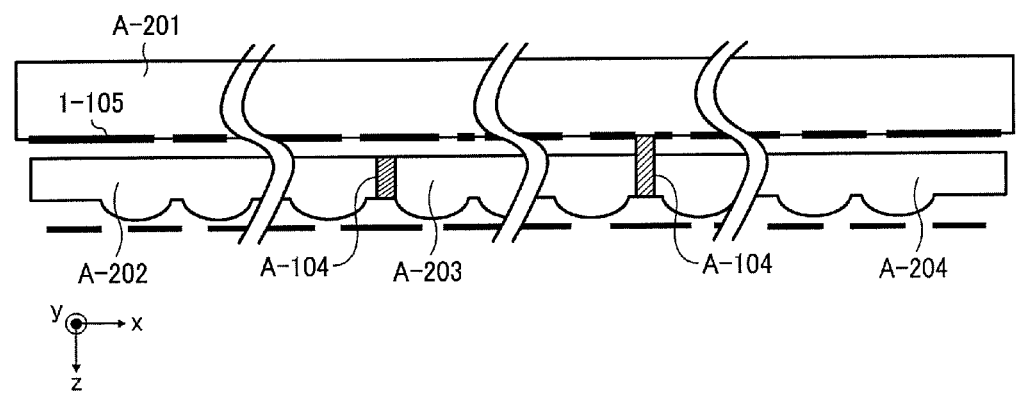
FIG. 22 shows another example of micro lens array.

FIG. 22 shows a configuration that can reduce a negative effect at the connection part A-104. As shown in FIG. 22, the pinhole array 1-105 may be formed on an one single long base plate A-201 having no connection parts, and the micro lens array 1-104 formed by bonding a first chip A-202, a second chip A-203, and a third chip A-204 may be disposed on and along the long base plate A-201. With such a configuration, light leaking from the connection part A-104 can be effectively prevented by the light shielding portion of the pinhole array 1-105, and thereby, the spectroscopic characteristics acquisition unit can conduct the measurement with higher precision.

As for the spectroscopic characteristics acquisition unit, the size of the spectroscopic characteristics acquisition unit can be reduced by setting a shorter distance from the pinhole array face to the sensor face, in which the angle of view of the image-focusing optical system needs to be set greater. As is apparent from the formula (B), the numerical aperture of lenses configuring the micro lens array 1-104 needs to be set greater to set a greater angle of view for the image-focusing optical system.

To do so, the micro lens array 1-104 having a higher sag height needs to be manufactured, but it is hard to manufacture such lens using an etching process. To manufacture the micro lens array 1-104 having a higher sag height with a simpler process, a portion of lenses of the micro lens array 1-104 may be cut in a given shape.

Figure 23:
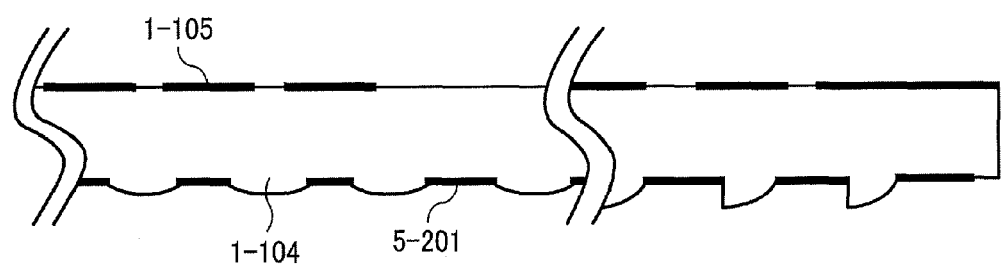
FIG. 23 shows an example configuration of a micro lens array, in which lenses are formed at a position aligned with a plurality of passing areas of mask and its vicinity.
Figure 24:
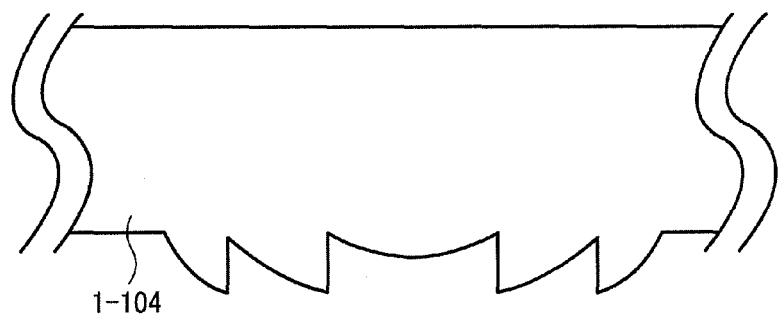
FIG. 24 shows an example configuration of a Fresnel lens used at one or more portions of micro lens array.

As described with reference to FIG. 19, the mask 5-201 having the plurality of passing areas is provided between the micro lens array 1-104 and the image bearing medium 1-101, in which a portion of lenses of the micro lens array 1-104 aligned with the passing area of the mask 5-20 is used as a lens but other portion of the micro lens array 1-104 is shielded by the mask 5-201 and not functioning as lens. Accordingly, as shown in FIG. 23, a lens portion can be formed only for portion aligned with the passing area of the mask 5-201 and its vicinity, and other portion may not be formed as lens, wherein such configuration may have no problem for functioning as a lens array. With such a configuration, the sag height or lens height of lenses can be reduced, by which a manufacturing process may be conducted easily. For example, as shown in FIG. 24, one or more of lenses of the micro lens array 1-104 may be formed as a Fresnel lens, in which the lens height can be reduced compared to forming a lens having a dome-like shape.

In the above described spectroscopic characteristics acquisition unit, the mask may be formed on the lens array integrally. With such a configuration, the spectroscopic characteristics acquisition unit can be configured with a lesser number of parts, and the effect of mechanical vibration and/or heat expansion to the unit can be reduced.

In the above described spectroscopic characteristics acquisition unit, a portion of lens array may be partially cut. With such a configuration, the sag height or lens height of lenses of lens array can be reduced, by which a manufacturing process of the spectroscopic characteristics acquisition unit may be conducted easily.

In the above described spectroscopic characteristics acquisition unit, the lens of lens array may be a Fresnel lens. With such a configuration, the sag height or lens height of lenses can be reduced, by which a manufacturing process of the spectroscopic characteristics acquisition unit may be conducted easily.

In the above described spectroscopic characteristics acquisition unit, the greater the number (N) of pixels configuring one spectroscopy sensor of the line sensor 1-108, the more detailed measurement result of spectroscopy profile can be obtained, which may be preferable. However, when the total number (A) of pixels in the line sensor 1-108 having a plurality of spectroscopy sensors is a given fixed numbers, the greater the number (N) of pixels configuring one spectroscopy sensor, the smaller the number of spectroscopy sensors that can be arrayed in one line sensor 1-108, which is indicated by "A/N" (A: total number of pixels in one line sensor, N: number of pixels configuring one spectroscopy sensor of one line sensor). Accordingly, as for the above-described spectroscopic characteristics acquisition unit, especially, for the spectroscopic characteristics acquisition unit to conduct measurement of color images, it may be preferable to reduce the number (N) of pixels as much as possible, and to conduct an estimation method such as Wiener estimation for estimating the spectroscopy profile. Such estimation process for spectroscopy profile can be conducted by known methods, for example, which is disclosed in paragraphs [0012] to [0022] of US-2009-0202120-A.

A description is given of an example method for estimating the spectroscopy profile based on the output vi from one spectroscopy sensor. Based on a row vector "v" storing signal outputs "vi" (i=1 to N) for N pixels configuring one spectroscopy sensor, and a transformation matrix G, the row vector "r" storing spectroscopy reflectance for a given wavelength band (e.g., separated into 31 section with a pitch of 10 nm at 400 nm through 700 nm) can be expressed as below.

$$r = Gv$$

The conversion matrix G can be obtained as follows for multiple samples (n samples) for which the spectrometric distribution is known in advance. The conversion matrix G is obtained based on a matrix R and a matrix V, by minimizing the square norm of error $\|\cdot\|2$ with the use of the least-squares method. The matrix R stores spectrometric distributions. The matrix V stores row vectors v that are obtained when the n samples are measured with the spectrometric measurement apparatus according to the present embodiment.

The transformation matrix G can be obtained from a matrix R and a matrix V, in which the matrix R stores spectroscopy profile for a large number of samples (n samples) as the known spectroscopy profile in advance, and the matrix V stores row vectors "v" obtained by measuring similar samples using the above described spectroscopic characteristics acquisition unit. Then, using the method of least squares, squared norm of error $\|\cdot\|2$ is minimized, and a value is obtained.

$$R = [r1, r2, \ldots, rn]$$

$$V = [v1, v2, \ldots, vn]$$

$$e = \|R - GV\|2 \rightarrow \min$$

The transformation matrix G is a regression coefficient matrix of a regression formula from V to R, where V is the explanatory variable and R is the objective variable. A Moore-Penrose generalized inverse matrix for providing a least-squares and minimum-norm solution of the matrix V is used to express such a transformation matrix G, which is expressed by the following formula.

$$G = RV^T(VV^T)^{-1}$$

The superscript T means transposition of the matrix, and the superscript −1 means the inverse matrix. The calculated conversion matrix G is stored. When the measurement is actually performed, the product of the transformation matrix G and the row vector r of the output signals is obtained. Based on the product, it is possible to estimate the row vector r of the spectroscopy profile of a given measurement target.

Figure 25:
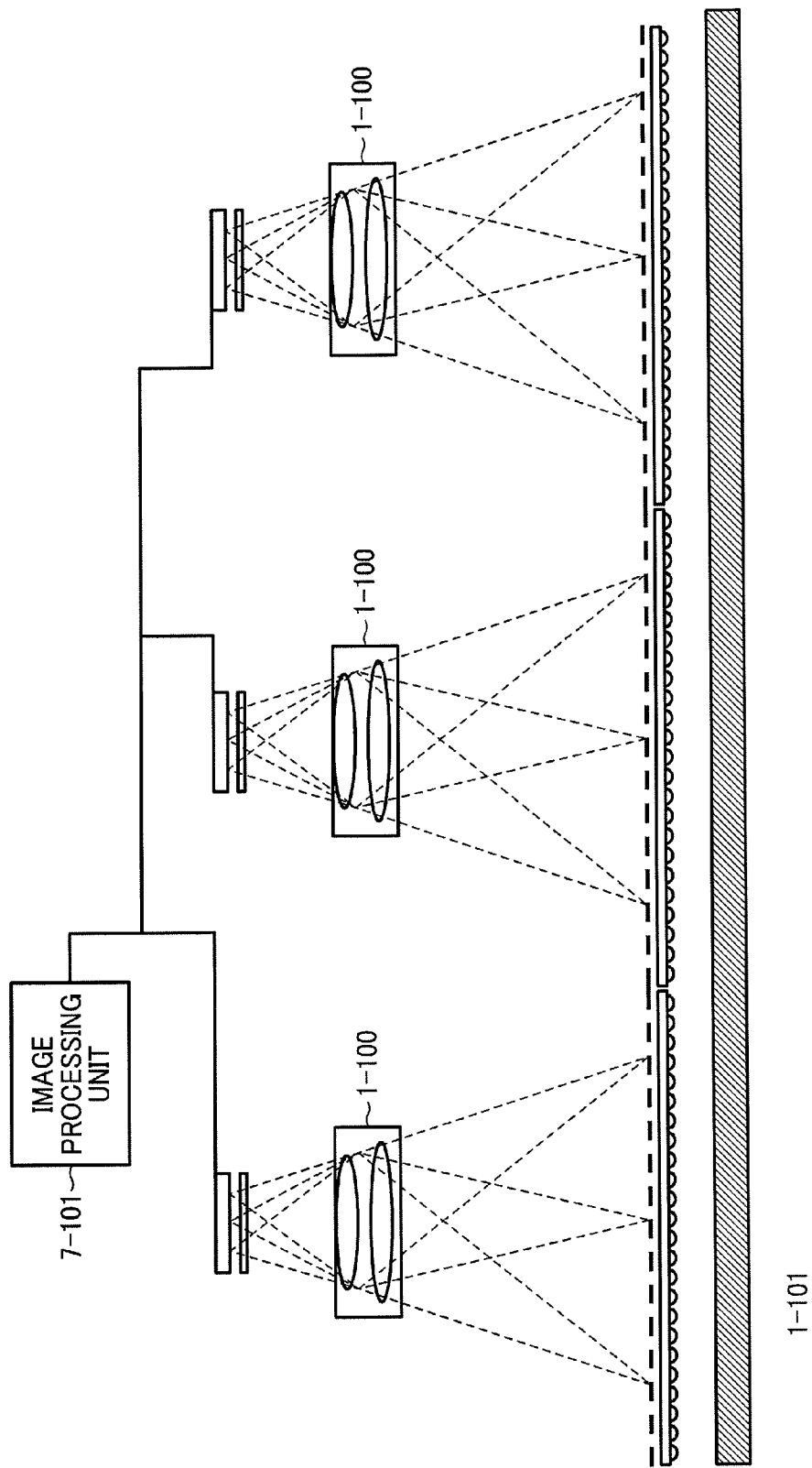
FIG. 25 shows a schematic configuration of an image evaluation unit according to an example embodiment.

Further, an image evaluation unit can be configured by employing the above-described spectroscopic characteristics acquisition unit. FIG. 25 shows an example configuration of the image evaluation unit, which may be used for an image forming apparatus, in which the image evaluation unit measures an entire image width formed on the image bearing medium 1-101 such as paper but not limited thereto. In FIG. 25, the image evaluation unit may use a plurality of spectroscopic characteristics acquisition units 1-100 (see FIGS. 5 and 6) arranged in one direction, by which spectral data can be obtained from a wider area. The image evaluation unit may be disposed with a sheet transport mechanism, in which sheets can be transported in a given direction by the sheet transport mechanism at a given speed. Further, an image processing unit 7-101 may be disposed as an image evaluator to process the output signals from the plurality of spectroscopic characteristics acquisition units 1-100, by which spectral image data for the entire image area can be computed in view of the information of transport speed of image bearing medium stored in advance or obtained by an encoder sensor disposed for the sheet transport mechanism.

The image evaluation unit may include the spectroscopic characteristics acquisition unit, and may be provided with the transporter such as sheet transport mechanism to transport the image bearing medium in one direction. Based on the result of spectral characteristics obtained by the spectroscopic characteristics acquisition unit, the color of image can be evaluated at a higher speed unaffected by positional deviation.

Figure 26:
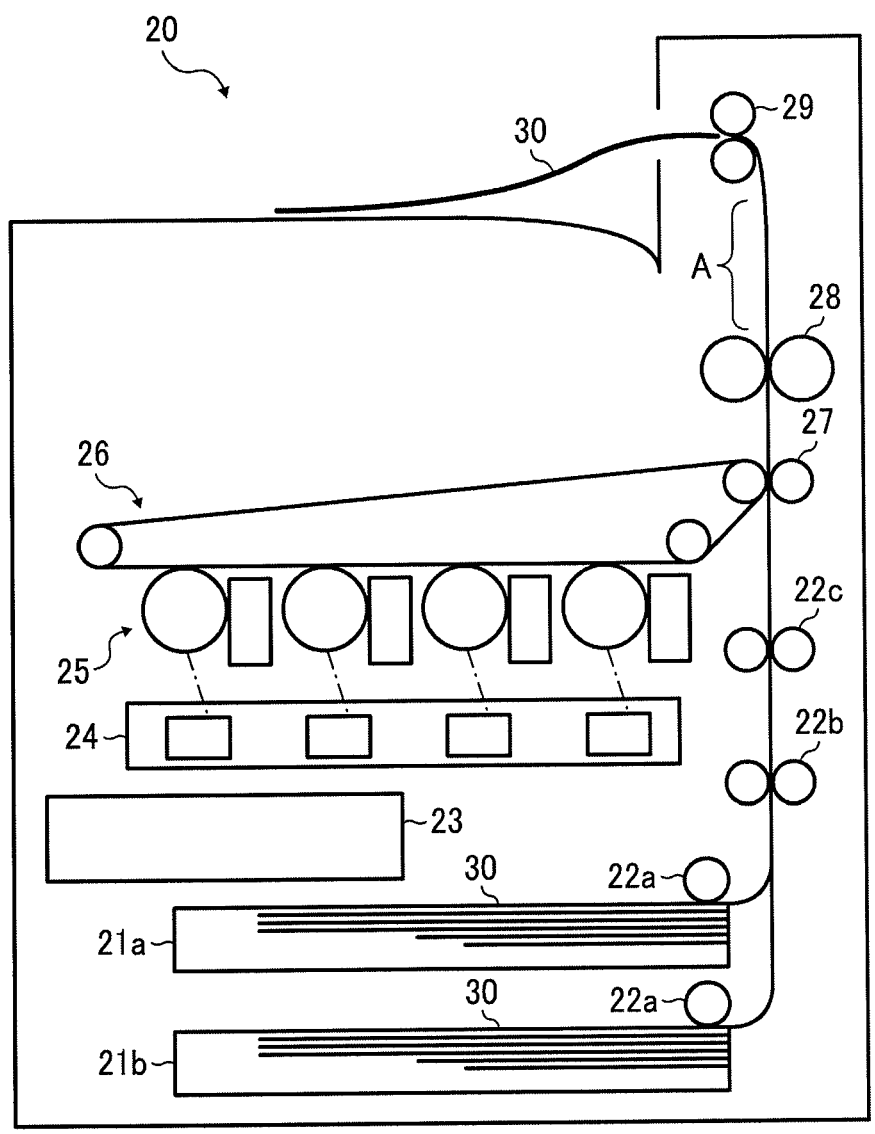
FIG. 26 shows a schematic configuration of image forming apparatus disposed with the image evaluation unit of FIG. 25.

The above described image evaluation unit can be provided in an image forming apparatus. FIG. 26 shows an image forming apparatus having the image evaluation unit of FIG. 25. An image forming apparatus 20 shown in FIG. 26 may include sheet feed trays 21a and 21b (or multiple sheet feed trays), sheet feed rollers 22a, transport rollers 22b, registration rollers 22c used as a transporter as a whole, a controller 23, an optical scanning unit 24, four photoconductor units 25 arranged in tandem, an intermediate transfer member 26, a secondary transfer roller 27, fusing unit 28, and a sheet ejection roller 29. Further, the image evaluation unit shown in FIG. 25 may be disposed at an area after the fusing unit 28, which is indicated by "A" in FIG. 26.

In the image forming apparatus 20, each of the photoconductor units 25 has the same configuration except colors used for the development agent, and each of the photoconductor units 25 has a photoconductor used as image carrying member, a charging unit, a development unit, a primary transfer unit, and a cleaning unit disposed around the photoconductor.

When an image forming operation is started, the photoconductor in each of the photoconductor units 25 rotates in a clockwise direction, and is charged by the charging unit. Then, the optical scanning unit 24 emits a laser beam, modulated based on image information, to each of the photoconductor of the photoconductor units 25 to form an electrostatic latent image on the photoconductor. The electrostatic latent image formed on each of the photoconductors is developed using development agent having different colors (e.g., yellow, cyan, magenta, black toner) stored in the development unit. The developed images on the photoconductors are sequentially superimposed and transferred onto the intermediate transfer member 26, rotating in a counter-clockwise direction by the primary transfer unit (primary transfer process), by which color image is formed on the intermediate transfer member 26.

Further, when the above described image forming operation is conducted, an image bearing medium 30 such as sheet, paper, or the like is fed from one of the sheet feed trays 21a and 21b at a given timing using the sheet feed roller 22a, and then transported to the registration roller 22c using a guide and the transport rollers 22b. Then, the registration roller 22c feeds the image bearing medium 30 to the secondary transfer nip. At the secondary transfer nip, the color image is transferred from the intermediate transfer member 26 to the image bearing medium 30 using the secondary transfer roller 27.

The color image transferred on the image bearing medium 30 is fused by a fusing roller and a pressure roller of the fusing unit 28, and the image bearing medium 30 having the fused image is ejected to an ejection tray by the sheet ejection roller 29.

In the image forming apparatus 20 of FIG. 26, the image evaluation unit shown in FIG. 25 may be disposed after the fusing unit 28, by which color quality of color image fused on the image bearing medium 30 such as paper can be evaluated. Based on the evaluation result of the image evaluation unit, the controller 23, used as a controlling unit of image forming apparatus 20, can conduct a correction operation for the image forming operation (feedback process), by which high quality image having less or no fluctuation of color quality across the entire image area can be provided. Further, if the image evaluation unit can conduct an automatic color calibration, the image forming apparatus can be operated reliably. Further, because image information can be obtained for the entire image area, inspection data and print data can be stored, by which an image forming apparatus having higher reliably can be provided.

In the above described spectroscopic characteristics acquisition unit, spectral characteristic of a measurement target for the entire width can be measured by reducing fluctuation of taken-light intensity for the entire sensing area, and maintaining the light intensity at a preferable level, by which the measurement can be conducted with a higher precision.

Further, in the above described spectroscopic characteristics acquisition unit, the spectroscopic characteristics acquisition unit can conduct the measurement with a higher spatial resolution Further, in the above described spectroscopic characteristics acquisition unit, the measurement can be conducted for the entire sensing area by reducing the effect of angle-specific spectral characteristics.

Further, in the above described spectroscopic characteristics acquisition unit, even if the distance deviation may occur between the measurement target and the lens array, the measurement can be can be conducted with a preferable measurement precision.

Further, the above described characteristics acquisition unit can be configured with a lesser number of parts, and the effect of mechanical vibration and/or heat expansion such as positional deviation to the unit can be reduced, by which the spectroscopic characteristics acquisition unit can be used with less deterioration.

Further, in the above described spectroscopic characteristics acquisition unit, the effect of stray light can be reduced, by which the measurement can be conducted with a higher precision.

Further, in the above described spectroscopic characteristics acquisition unit, the lens array may be manufactured with a simpler process.

Further, the above described spectroscopic characteristics acquisition unit can be employed for the image evaluation unit, and the image evaluation unit can be employed for the image forming apparatus.

Numerous additional modifications and variations are possible in light of the above teachings. It is therefore to be understood that within the scope of the appended claims, the disclosure of the present invention may be practiced otherwise than as specifically described herein. For example, elements and/or features of different examples and illustrative embodiments may be combined each other and/or substituted for each other within the scope of this disclosure and appended claims.

What is claimed is:

1. A spectroscopic characteristics acquisition unit, comprising:
    a light emitting unit to emit light to illuminate a measurement target;
    a lens array including a plurality of lenses arranged in one direction to receive a portion of reflected light reflected from the measurement target;
    a light blocking member having a pinhole array therein comprising a plurality of openings arranged in one direction, light coming from the lens array passing through the plurality of openings;
    a focusing unit to focus light coming from the pinhole array as an image at a given position;
    a diffraction unit to diffract the light to different directions depending on wavelength of light received by the focusing unit; and
    a light receiving unit to receive the reflected light diffracted by the diffraction unit, the light receiving unit being positioned at a position where the focusing unit focuses an image,
    the light receiving unit including a spectroscopic sensor array having a plurality of spectroscopy sensors arranged in one direction, each of the spectroscopy sensors including a given number of pixels arranged in one direction, each pixel being sensitive to different light having different spectral characteristics,
    each of the lenses constituting the lens array corresponding to one of the openings of the pinhole array,
        the numerical aperture NA of the lens in the arrangement direction of the lenses in the lens array satisfying the formula NA>sin($\theta$max) with respect to the maximum angle of view $\theta$max of the focusing unit.

2. The spectroscopic characteristics acquisition unit of claim 1, wherein each one of the lenses constituting the lens array is disposed at a position to focus an image on a surface of the measurement target onto the openings of the pinhole array, and an image focusing magnification ratio M satisfies the formula M<d/p with respect to a distance pitch "p" of the pinholes of the pinhole array and an opening size "d" of the pinholes arranged in the arrangement direction of the pinhole array.

3. The spectroscopic characteristics acquisition unit of claim 1, wherein the pinhole array has at least one opening deviated from the center optical axis of a corresponding lens, and an amount of deviation differs depending on location of the opening.

4. The spectroscopic characteristics acquisition unit of claim 1, wherein the plurality of openings of the pinhole array is disposed at or near a focus point of the corresponding lens.

5. The spectroscopic characteristics acquisition unit of claim 1, further comprising a base member for the lens array, wherein the pinhole array is formed on the base member for the lens array.

6. The spectroscopic characteristics acquisition unit of claim 1, further comprising a mask having a plurality of passing areas disposed between the measurement target and the lens array, each of the plurality of passing areas corresponding to one of lenses constituting the lens array.

7. The spectroscopic characteristics acquisition unit of claim 6, wherein the mask has at least one passing area deviated from the center optical axis of a corresponding lens depending on a position of passing area, and a deviation amount of the passing areas of the mask increases with distance from the center of the lens array.

8. The spectroscopic characteristics acquisition unit of claim 6, wherein the mask and the lens array are a single integrated unit.

9. The spectroscopic characteristics acquisition unit of claim 7, wherein the lenses constituting the lens array have a first area to function as a lens and a second area not to function as a lens, wherein the first area of the lens is aligned with one of the passing areas of the mask to receive light passing the one of the passing areas of the mask.

10. The spectroscopic characteristics acquisition unit of claim 9, wherein the lenses constituting the lens array are Fresnel lenses.

11. An image evaluation unit for evaluating color of a color image formed on an image bearing medium, comprising:
- a transporter to transport the image bearing medium;
- the spectroscopic characteristics acquisition unit of claim 1; and
- an image evaluator to evaluate the color of the image formed on an image bearing medium, transported by the transporter, based on spectral characteristics obtained by the spectroscopic characteristics acquisition unit.

12. An image forming apparatus for forming an image on an image bearing medium comprising the image evaluation unit of claim 11 to obtain an evaluation of the color of the color image formed on an image bearing medium for conducting a feedback operation.

* * * * *